US011860971B2

(12) United States Patent
Buda et al.

(10) Patent No.: US 11,860,971 B2
(45) Date of Patent: Jan. 2, 2024

(54) ANOMALY DETECTION

(71) Applicant: International Business Machines Corporation, Armonk, NY (US)

(72) Inventors: Teodora Buda, Dublin (IE); Hitham Ahmed Assem Aly Salama, Dublin (IE); Bora Caglayan, Dublin (IE); Faisal Ghaffar, Castle Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 15/988,506

(22) Filed: May 24, 2018

(65) Prior Publication Data

US 2019/0362245 A1 Nov. 28, 2019

(51) Int. Cl.
 *G06N 5/04* (2023.01)
 *G06F 17/18* (2006.01)
 *G06N 7/01* (2023.01)

(52) U.S. Cl.
 CPC .............. *G06F 17/18* (2013.01); *G06N 5/04* (2013.01); *G06N 7/01* (2023.01)

(58) Field of Classification Search
 CPC ........... G06N 5/04; G06N 7/005; G06F 17/18
 See application file for complete search history.

(56) References Cited

U.S. PATENT DOCUMENTS

| 7,162,741 | B2 | 9/2007 | Eskin et al. |
| 7,707,091 | B1 | 4/2010 | Kauffman et al. |
| 9,323,599 | B1 | 4/2016 | Iyer et al. |
| 9,727,533 | B2 | 8/2017 | Thibaux |
| 9,779,361 | B2 | 10/2017 | Jones et al. |
| 2003/0065409 | A1* | 4/2003 | Raeth ................. G05B 23/0254 700/31 |
| 2011/0119100 | A1 | 5/2011 | Ruhl et al. |
| 2014/0108640 | A1 | 4/2014 | Mathis |

(Continued)

FOREIGN PATENT DOCUMENTS

| CN | 104350471 B | 5/2017 |
| CN | 107409075 A | 11/2017 |
| EP | 3139313 A2 | 3/2017 |

OTHER PUBLICATIONS

Golmohammadi, Koosha, and Osmar R. Zaiane. "Time series contextual anomaly detection for detecting market manipulation in stock market." In 2015 IEEE International Conference on Data Science and Advanced Analytics (DSAA), pp. 1-10. IEEE, 2015. (Year: 2015).*

(Continued)

*Primary Examiner* — Casey R. Garner
(74) *Attorney, Agent, or Firm* — Edell, Shapiro & Finnan, LLC

(57) ABSTRACT

According to an embodiment of the present invention, an approach accurately detects anomalies or outliers of a time-series dataset. A method for identifying whether a particular data element of the time-series dataset is an outlier comprises predicting a value for that particular data element and obtaining a threshold value that defines, relative to the predicted value, whether an actual value of the data element is an outlier. In an aspect of a present invention embodiment, the threshold value is generated based on historic error values associated with data elements temporally preceding the particular data element of the time-series dataset.

22 Claims, 12 Drawing Sheets

(56) References Cited

U.S. PATENT DOCUMENTS

| | | | |
|---|---|---|---|
| 2015/0127595 A1 | 5/2015 | Hawkins et al. | |
| 2015/0269050 A1* | 9/2015 | Filimonov | G06N 20/10 |
| | | | 702/183 |
| 2015/0278160 A1* | 10/2015 | Jones | G06F 17/10 |
| | | | 702/181 |
| 2015/0339265 A1* | 11/2015 | Thibaux | G06K 9/00536 |
| | | | 702/179 |
| 2015/0356421 A1 | 12/2015 | Jones et al. | |
| 2016/0299938 A1* | 10/2016 | Malhotra | G06K 9/6284 |
| 2018/0046926 A1* | 2/2018 | Achin | G06Q 10/04 |
| 2019/0102718 A1* | 4/2019 | Agrawal | G06Q 10/06315 |
| 2019/0129821 A1* | 5/2019 | Lee | G06F 11/3452 |

OTHER PUBLICATIONS

Gao, Ke, Feng-Jing Shao, and Ren-Cheng Sun. "n-INCLOF: A dynamic local outlier detection algorithm for data streams." In 2010 2nd International Conference on Signal Processing Systems, vol. 2, pp. V2-179. IEEE, 2010. (Year: 2010).*

Yu, Yufeng, Yuelong Zhu, Shijin Li, and Dingsheng Wan. "Time series outlier detection based on sliding window prediction." Mathematical problems in Engineering 2014 (2014). (Year: 2014).*

Shipmon, Dominique T., Jason M. Gurevitch, Paolo M. Piselli, and Stephen T. Edwards. "Time series anomaly detection; detection of anomalous drops with limited features and sparse examples in noisy highly periodic data." arXiv preprint arXiv:1708.03665 (2017). (Year: 2017).*

Groth, Randall E., and Jennifer A. Bergner. "Preservice elementary teachers' conceptual and procedural knowledge of mean, median, and mode." Mathematical Thinking and Learning 8, No. 1 (2006): 37-63. (Year: 2006).*

International Search Report and Written Opinion in International Application No. PCT/IB2019/054145, dated Aug. 26, 2019, 8 pages.

UK Examination Report in corresponding UK Application No. GB2019684.6, dated Jan. 20, 2021, 5 pages.

Thi et al., "One-class Collective Anomaly Detection based on LSTM-RNNs", https://arxiv.org/ftp/arxiv/papers/1802/1802.00324.pdf, retrieved from internet May 2018, 13 pages.

Sharma, "Anomaly Detection of Time Series Data using Machine Learning & Deep Learning", https://www.linkedin.com/pulse/anomaly-detection-time-series-data-using-machine-deep-xenonstack, Jul. 2017, 11 pages.

Y. Wang, et al., "A Two-Step Parametric Method for Failure Prediction in Hard Disk Drives", IEEE Transactions on Industrial Informatics, vol. 10, No. 1, Feb. 2014, 12 pages.

Marco Bertini, et al., "Multi-scale and real-time non-parametric approach for anomaly detection and localization", Computer Vision and Image Understanding 116 (2012) 320-329, 11 pages.

Nico Görnitz, et al., "Toward supervised anomaly detection", Journal of Artificial Intelligence Research 46 (2013) 235-262, 28 pages.

Keith Noto, et al., "FRaC: a feature-modeling approach for semi-supervised and unsupervised anomaly detection", Data Min Knowl Discov. 2012 ; 25(1): 109-133. doi:10.1007/s10618-011-0234-x., 35 pages.

Mennatallah Amer, "Enhancing One-Class Support Vector Machines for Unsupervised Anomaly Detection", A thesis submitted in partial fulfillment of the requirements for the degree of Master of Science in Computer Science and Engineering, Mar. 27, 2013, 88 pages.

S. Rajasegarar, et al., "Hyperspherical cluster based distributed anomaly detection in wireless sensor networks", J. Parallel Distrib. Comput. (2013), http://dx.doi.org/10.1016/j.jpdc.2013.09.005, 24 pages.

Nikolay Laptev, et al., "Generic and Scalable Framework for Automated Time-series Anomaly Detection", KDD'15, Aug. 10-13, 2015, Sydney, NSW, Australia, 9 pages.

Teodora Sandra Buda, et al. "ADE: An Ensemble Approach for Early Anomaly Detection", 2017 IFIP/IEEE International Symposium on Integrated Network Management (IM2017): Mini-Conference, 7 pages.

Dunlop, N., "Statistical Calculations", pp. 203-224. Apress, Berkeley, CA, (2015), https://doi.org/10.1007/978-1-4842-0529-7_10, 22 pages.

Notice of Reasons for Refusal in corresponding Japanese Application No. 2020-559506, dated Nov. 14, 2022, 6 pages.

* cited by examiner

ANOMALY DETECTION

BACKGROUND

The present invention embodiments relate to anomaly detection and in particular to detection of anomalies using a data modelling approach. The present invention embodiments further relate to a computer program product comprising computer-readable program code that enables a processor of a system to implement such a method. The present invention embodiments further relate to a system for detecting anomalies. Such a system may be used to identify anomalies in any data found across a variety of different domains. Such data may include, for example, health data (e.g., for detecting unusual test results), security data (e.g., for detection of fraud/intrusion) or communication data (e.g., for detecting transmission errors).

Anomaly detection aims to identify a data point or pattern of data that deviates from an expected behavior of that data point or pattern (e.g., an anomaly). In different fields, anomalies may alternatively be labelled outliers, discordant observations, exceptions, aberrations, surprises, peculiarities or contaminants.

Anomaly detection is useful in various application domains (e.g., health, security for fraud/intrusion detection, systems), and is particularly beneficial for 5G network operators to avoid or detect in a timely manner performance degradations which can otherwise lead to service outages and increased costs for maintenance. The objective is to detect the degradations either in a proactive (e.g., prepare before they occur) or reactive (e.g., react after they occur) manner to allow to apply corrective actions at an early stage to minimize their impact and reduce cost.

There are a plethora of anomaly detection techniques which can be classified based on the type of strategy employed: i) instance-based methods, a popular formulation of outlier detection is to find unusual points in multi-dimensional data by their distance to the neighboring points, and (ii) explicit generalization methods, another popular approach where a summarized model is created up front which will model the normal behavior of the monitored instance, and further use the deviation between the expected normal behavior and actual behavior as error metric for anomaly detection.

Most common existing techniques deployed in real systems employ threshold based methods, which can be categorized into parametric and non-parametric ones. Parametric methods make assumptions of the underlying distribution of the dataset and determine threshold values based on the distribution. However, this assumption is many times unrealistic and violated in practice. Moreover, non-parametric methods avoid making such assumptions but determine the threshold in an ad-hoc manner. However, both approaches are generally non-realistic, do not adapt to varying patterns in incoming datasets, and often require significant efforts in tuning the threshold value.

More complex anomaly detection techniques employ machine learning methods, which can be divided into three classes: supervised, semi-supervised and unsupervised. Supervised learning anomaly detection requires a dataset where each instance is labeled and typically it involves training a classifier on a training set. Semi-supervised algorithms, such as construct a model to represent the normal behavior from an input normal training dataset, follow the model to calculate the likelihood of the testing dataset to be generated by the model. Unsupervised models do not require a labeled dataset and operate under the assumption that the majority of the data points are normal and return the remaining ones as outliers.

However, most approaches, such as statistical and probabilistic models, are typically suitable for univariate datasets where a single metric is monitored at a time. This can be extended to multiple metrics, by building a model for each metric; however, this would not consider directly any correlations between metrics. Hence, these approaches cannot easily be extended to multivariate analysis where correlations among metrics can be used to identify potential anomalous behavior. Further, existing approaches typically rely on datasets that contain ground truth labels, where the anomalies are specifically pin pointed to a data point. This can be difficult to gather in real-life scenarios as labelled data is expensive and requires expert knowledge which might be affected by human errors in labelling the data. In addition, the initial model might not generalize to new types of anomalies unless retrained, thereby requiring expert knowledge for the entire duration of the deployment of the anomaly detection model. This makes these approaches unrealistic to be deployed in such a dynamic environment as the 5G network.

SUMMARY

The present invention embodiments seek to provide a method for determining whether a data element, having a value, of a time-series dataset is an outlier.

The present invention embodiments further seek to provide a computer program product including computer program code for implementing the method when executed on a processor of a data processing system.

The present invention embodiments further seek to provide a system adapted to execute this computer program code.

The present invention embodiments further seek to provide a system for determining whether a data element, having a value, of a time-series dataset is an outlier.

According to an embodiment of the present invention, there is provided a computer-implemented method for determining whether a data element, having a value, of a time-series dataset is an outlier. The method comprises obtaining prediction data, for predicting a value of the data element, from first data of the time-series dataset that temporally precedes the data element and predicting, using the prediction data, a predicted value of the data element. The method also comprises obtaining historic error values for the time-series dataset, each historic error value being representative of a difference between a value and a predicted value of a second data element of the time-series dataset that temporally precedes the data element. The method further comprises obtaining, based on the one or more historic error values, a threshold value for defining, relative to the predicted value of the data element, values for the data element that are considered to be outliers and determining whether the data element is an outlier based on the threshold value, the predicted value and the value of the data element.

Using historic error values in the generation of the threshold value increases an accuracy in identifying outlying data values. In particular, it can be readily seen whether a current error value has deviated from expected error values (e.g., from the historic data values) to identify whether the error value associated with the data element falls within a normal or expected range.

Thus, using historic error values improves an accuracy and precision in identifying outlying data elements of a time-series dataset.

The historic error values may each be a squared error value. A squared error value is the square of a difference between a predicted value for a data element and the actual value of the data element. A mean squared error value may be used as a historic error value for a data element comprising a plurality of values.

Using historic squared error values to calculate the threshold value results in improved accuracy and precision in identifying outlier data based on benchmark testing. This effect is particularly pronounced when a squared error value of the data element under investigation is used to compare to the threshold value to determine if the investigated data element is an outlier.

In some embodiments of the present invention, each historic error value is scaled to a value between 0 and 1 (e.g., normalized). This ensures that particular historic error values do not disproportionally affect the calculation of the threshold value. The error value, which is compared to the threshold value, of the data element (under investigation) may also be scaled between 0 and 1 (e.g., using the same scaling factor as for the historic value) for the sake of improved consistency.

In further embodiments of the present invention, a standard deviation of the historic error values is used to calculate or otherwise obtain the threshold value. As a standard deviation is representative of a normal or expected behavior of a system, using a standard deviation of the historic error values to generate the threshold value allows for accurate identification of outliers.

The principle of Chebyshev's inequality may be exploited to determine, based on the standard deviation, a suitable threshold value for identifying an outlying data element. This improves a reliability of detecting outlying data elements, as no assumption is made about the underlying distribution of the historic error values. This thereby increases the number of applications for which the outlier detection method can be used (e.g., where a non-normal distribution is not expected).

In particular embodiments of the present invention, patterns of the historic error data may be exploited to improve an accuracy in identifying an outlying data element. It has been recognized that there may be a periodicity in historic error values, in that error values at a same time of hour/day/week (or other period) are similar. Thus, using historic error values associated with periodic time periods allows for more accurate identification of outlying data elements, as such periodicity can be considered part of expected normal behavior. In other words, the behavior of a time-series dataset may vary periodically, so that similar behavior (matching the periodicity of the time-series dataset) can be considered normal. In various examples, the predetermined time period may be an hour, a day or a week, as a time-series dataset is more likely to have a periodic behavior with such a time period.

The step of predicting a predicted value of the data element may comprise. predicting, using the prediction data and a plurality of different prediction models, a respective plurality of potential predicted values for the data element. This same step may also comprise assigning the potential predicted value that is closest to the value of the data element as the predicted value.

If none of a plurality of models has managed to accurately predict the value of the data element under investigation, then it is more likely that it is an anomaly or outlier. Thus, by using a prediction value (of a plurality of possible prediction values) that is closest to the actual/measured value of the data element, an accuracy and reliability of identifying anomalous data elements can be increased.

Benchmark tests have shown that it is particularly efficient to use a plurality of prediction models to generate the predicted value. In particular, a precision and recall of detecting outlying data elements is enhanced.

According to another embodiment of the present invention, there is provided a computer program product for determining whether a data element, having a value, of a time-series dataset is an outlier. The computer program product comprises a computer readable storage medium having program instructions embodied therewith, the program instructions executable by a processing unit to cause the processing unit to perform methods according to embodiments of the present invention, such as those previously described.

There is also provided a system comprising at least one processor and the computer program product according to an embodiment of the present invention. The at least one processor is adapted to execute the computer program code of the computer program product.

Thus, there is provided a system for determining whether a data element, having a value, of a time-series dataset is an outlier. The system comprises a first obtaining unit adapted to obtain prediction data, for predicting a value of the data element, from first data of the time-series dataset that temporally precedes the data element. The system further comprises a prediction unit adapted to predict using the prediction data, a predicted value of the data element. The system also comprises a second obtaining unit adapted to obtain historic error values for the time-series dataset, each historic error value being representative of a difference between a value and a predicted value of a second data element of the time-series dataset that temporally precedes the data element. The second obtaining unit may further be adapted to obtain, based on the one or more historic error values, a threshold value for defining, relative to the predicted value of the data element, values for the data element that are considered to be outliers. The system further comprises a determining unit adapted to determine whether the data element is an outlier based on the threshold value, the identified predicted value and the value of the data element.

BRIEF DESCRIPTION OF THE DRAWINGS

Preferred embodiments of the present invention will now be described, by way of example only, with reference to the following drawings, in which.

DETAILED DESCRIPTION

Figure 1:
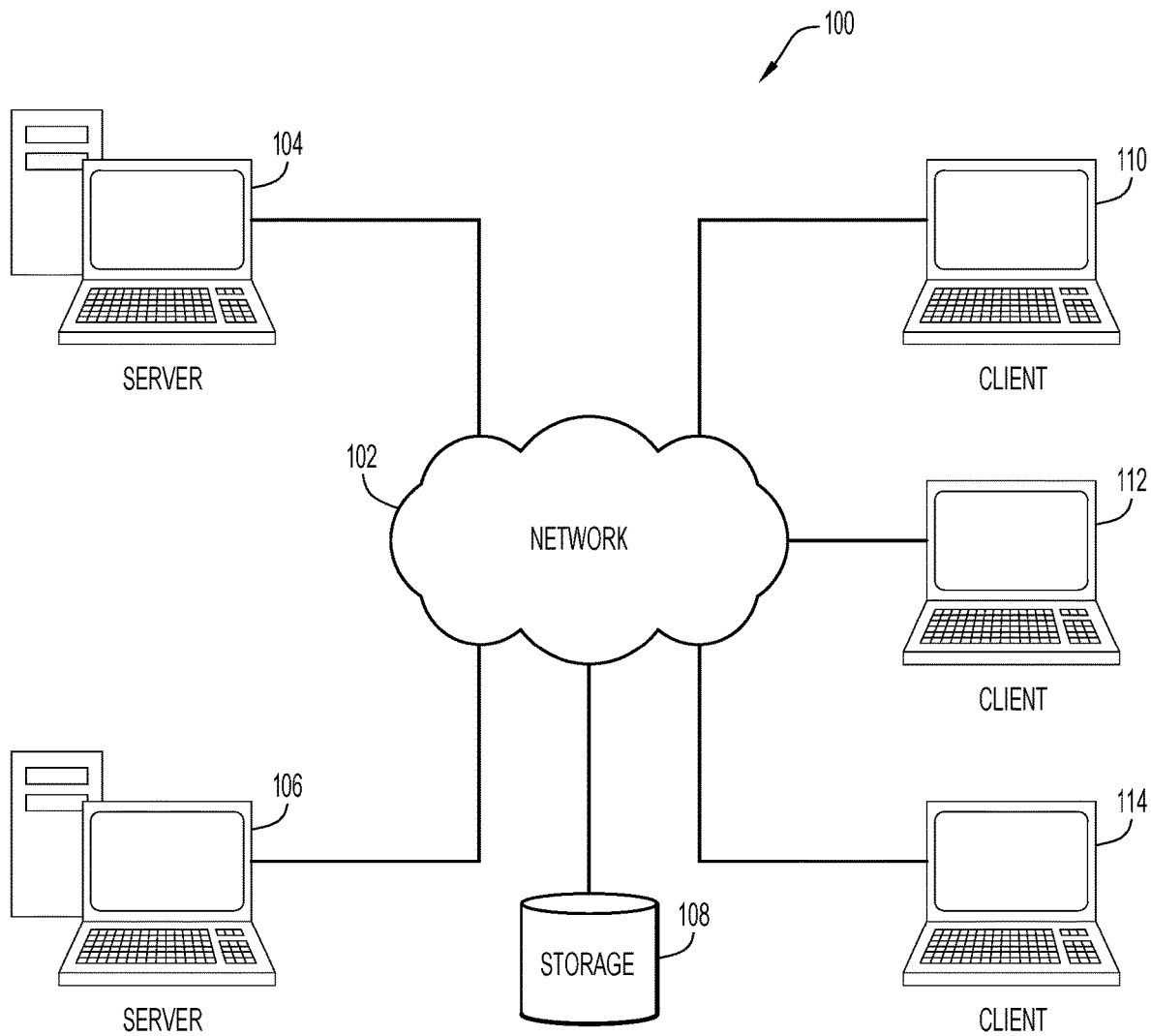
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, e.g., is a computer-implementable or computer-implemented method. The various steps of the method therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Present invention embodiments provide an approach based on explicit generalization models to discover anomalies in a timely manner by utilizing a plethora of both statistical and probabilistic approaches along with deep learning models for creating predictions. The closest prediction to the actual values is selected at each timestamp, thereby leading the anomaly detection solution to only alert for the true positive anomalies and have a least amount of false negatives.

The approach of present invention embodiments also utilizes a non-traditional dynamic sliding window mechanism for determining a dynamic threshold fitted for each time-series under analysis, where the dynamic window contains rescaled squared errors for each point to ensure the accuracy is highest.

Other aspects make the approach of present invention embodiments more effective in practice compared to other anomaly detection techniques. In general, anomaly detection algorithms typically require a user to choose a threshold which can be difficult to determine, and to provide golden labels for testing, which can be expensive to collect and error-prone. This is avoided by the anomaly detection approach of present invention embodiments which computes a dynamic threshold based on the past prediction errors, and requires no labels for training since a semi-supervised learning approach is employed. Furthermore, the LSTM model of present invention embodiments can receive as input multiple features, which makes present invention embodiments multivariate in contrast to univariate anomaly detectors since present invention embodiments can use a single model that can capture anomalies across multiple features.

Proposed are concepts for accurately detecting anomalies or outliers of a time-series dataset. In particular, proposed concepts rely on a common underlying method of identifying whether a particular data element of the time-series dataset is an outlier. This common method comprises predicting a value for that particular data element and obtaining a threshold value that defines, relative to the predicted value, whether an actual value of the data element is an outlier.

In some examples, an error value of the particular data element is obtained, an error value being representative of a difference between an actual value and a predicted value of that data element. This error value can be compared to the threshold value to determine whether the actual value, and therefore the associated data element, is an outlier. This provides a highly accurate, but adaptable, method of determining whether a data element is an outlier.

In embodiments of the present invention, prediction data used to predict the value of the data element comprises a predetermined number of other data elements of the time-series dataset that temporally precede the data element.

According to an embodiment of the present invention, historic error values are used to identify whether a later data element is an outlier. Here, historic error values are error values associated with data elements that precede (e.g., are temporally earlier than) the data element under investigation in the time-series dataset. In particular, historic error values are used to generate a threshold value that is used to define whether a data element is an outlier.

Embodiments of the present invention are based on the realization that historic error values, each representing a difference between a predicted value and an actual value of a previous data element in a time-series dataset, can be used to identify whether a current data element is an outlier. In particular, it can be determined whether a current error value (being an error value associated with the current data element under assessment or investigation) is within a normal range or whether it is an outlier. This allows for improved assessment of whether a data element is an outlier, relative to previous data elements of the time-series dataset.

Thus, embodiments of the present invention propose to use historic error values to generate a threshold value for determining whether a (current) data element is an outlier.

According to an embodiment of the present invention, multiple prediction models are used to generate a prediction value for the data element under investigation. The prediction value generated by the prediction model that generates the prediction value that best matches the actual value of the data element, or the prediction value of the prediction model that best predicts the overall time-series dataset including the data element, is selected as the prediction value.

Thus, in an embodiment of the present invention, numerous potential values for the prediction value are generated and the potential prediction value that is closest to the actual value of the data element (under investigation) is selected as the prediction value.

If none of a plurality of models has managed to accurately predict the value of the data element under investigation, then it is more likely that it is an anomaly or outlier. Thus, by using a prediction value (of a plurality of possible prediction values) that is closest to the actual/measured value of the data element, an accuracy and reliability of identifying anomalous data elements can be increased.

A method/system of embodiments of the present invention employs concepts of generating a threshold value based on historic error values and generating a prediction value using multiple prediction models, to provide a particularly efficient, precise and accurate method of identifying whether a data element is an outlier.

However, a method of an embodiment of the present invention employs a concept of generating prediction values using multiple prediction models that can, by itself, improve the accuracy of identifying outliers. Thus, there is also envisaged a method in which the threshold value does not need to be generated using historic error values.

Thus, there may be provided a computer-implemented method for determining whether a data element, having a value, of a time-series dataset is an outlier. Such a method comprises: obtaining prediction data, for predicting a value of the data element, from first data of the time-series dataset that temporally precedes the data element; predicting, using the prediction data and a plurality of different prediction models, a respective plurality of predicted values for the data element; identifying, from the plurality of predicted values, the predicted value that is closest to the value of the data element; obtaining a threshold value for defining, relative to the predicted value of the data element, values for the data element that are considered to be outliers; and determining whether the data element is an outlier based on the threshold value, the identified predicted value and the value of the data element.

The prediction data may comprise a predetermined number of other data elements of the time-series dataset that temporally precede the data element.

The step of obtaining a threshold value may comprise obtaining historic error values for the time-series dataset, each historic error value being representative of a difference between a value of second data of the time-series dataset that temporally precedes the data element and a corresponding predicted value of the second data of the time-series dataset. The step of obtaining the threshold value may further comprise obtaining a threshold value based on the one or more historic error values.

Preferably, each historic error value is a squared error value, being the square of the difference between the value of the second data of the time-series dataset that temporally precedes the data element and the corresponding predicted value of the second data of the time-series dataset.

The step of obtaining a threshold value may comprise scaling each historic error value to a value between 0 and 1, based on the maximum value of the historic error values.

The step of obtaining a threshold value may comprise calculating the standard deviation of the historic error values and obtaining the threshold value based on the standard deviation of the historic error values.

The step of obtaining the threshold value may further comprise multiplying the standard deviation of the historic error values by a predetermined number to obtain the threshold value. Preferably, the step of obtaining the threshold value comprises calculating the predetermined number using Chebyshev's inequality.

In embodiments of the present invention, the second data corresponds to data of the time-series dataset obtained a multiple of a predetermined time periods prior to the data element. Preferably, the predetermined time period is an hour, a day or a week.

In at least one embodiment of the present invention, the data element is a data point of the time-series dataset.

There may also be provided a computer program product for determining whether a data element, having a value, of a time-series dataset is an outlier. The computer program product comprises a computer readable storage medium having program instructions embodied therewith. The program instructions are executable by a processing unit to cause the processing unit to perform a method comprising: obtaining prediction data, for predicting a value of the data element, from first data of the time-series dataset that temporally precedes the data element and predicting, using the prediction data and a plurality of different prediction models, a respective plurality of predicted values for the data element; identifying, from the plurality of predicted values, the predicted value that is closest to the value of the data element; obtaining a threshold value for defining, relative to the predicted value of the data element, values for the data element that are considered to be outliers; and determining whether the data element is an outlier based on the threshold value, the identified predicted value and the value of the data.

There is also proposed a computer system comprising at least one processor and the computer program product previously described, where the at least one processor is adapted to execute the computer program code of the computer program product.

There may also be provided a system for determining whether a data element, having a value, of a time-series dataset is an outlier. The system comprises a first obtaining unit adapted to obtain prediction data, for predicting a value of the data element, from first data of the time-series dataset that temporally precedes the data element. The system also comprises a prediction unit adapted to predict, using the prediction data and a plurality of different prediction models, a respective plurality of predicted values for the data element; and identify, from the plurality of predicted values, the predicted value that is closest to the value of the data element. The system further comprises a second obtaining unit adapted to obtain a threshold value for defining, relative to the predicted value of the data element, values for the data element that are considered to be outliers; and a determining unit adapted to determine whether the data element is an outlier based on the threshold value, the identified predicted value and the value of the data element.

Figure 2:
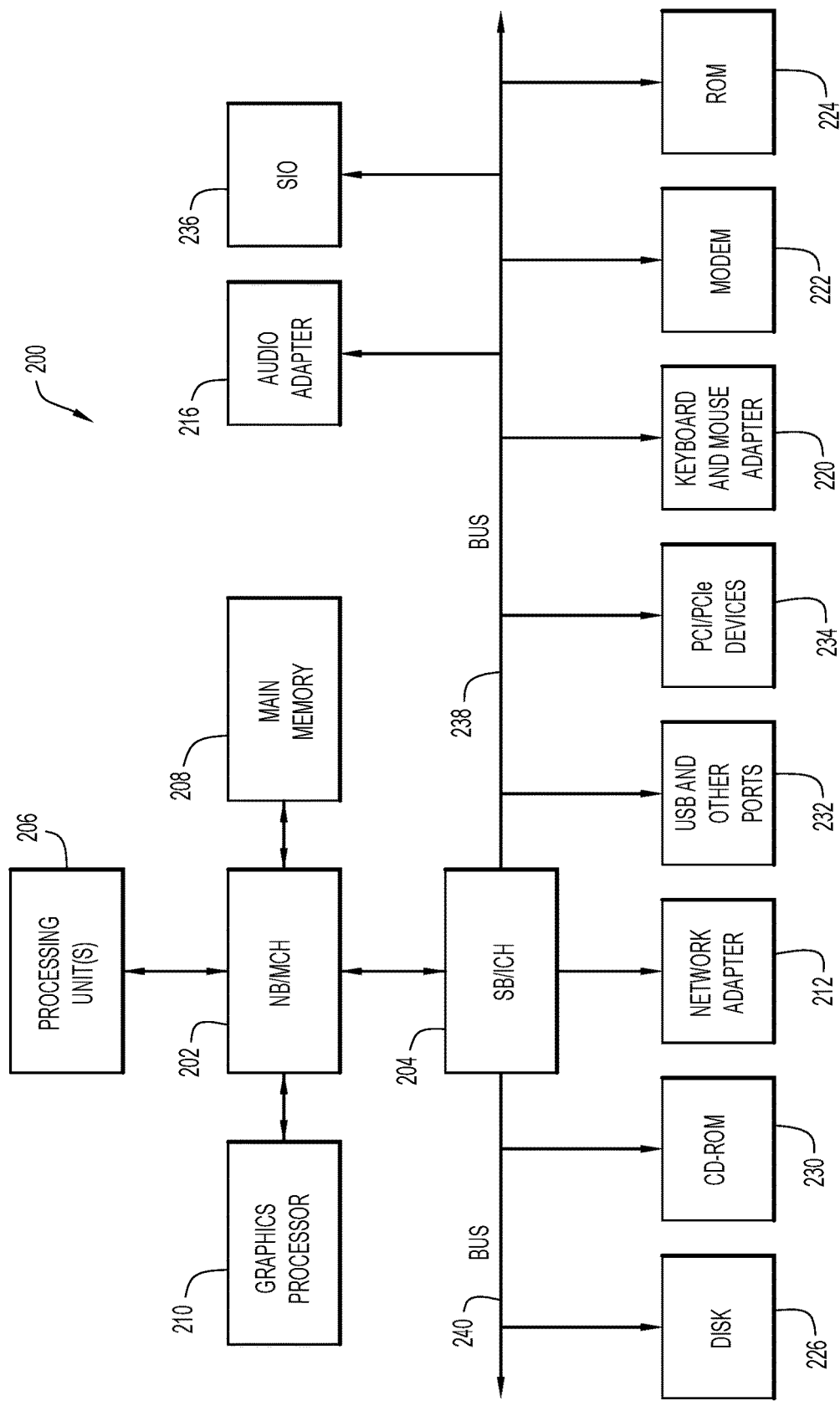
FIG. 2 is a block diagram of an example system in which aspects of the illustrative embodiments may be implemented.

Illustrative embodiments of the present invention may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the scope of the present invention.

FIG. 1 depicts a pictorial representation of an exemplary distributed transaction processing storage system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprising thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments of the present invention may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the JAVA programming system, may run in conjunction with the operating system and provides calls to the operating system from JAVA programs or applications executing on system 200.

As a server, system 200 may be, for example, an IBM ESERVER SYSTEM P computer system, running the ADVANCED INTERACTIVE EXECUTIVE (AIX) operating system or the LINUX operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment of the present invention may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As used herein, the term "data element" is used to refer to a part or portion of a time-series dataset, such as one or more data points of the dataset. A single data element may encompass a set of data points or a single data point. A data element may be associated with one or more timestamps, which may each represent a single instance in time or a period of time (e.g., a series of successive instances in time). Each data element may be associated with a single value or a plurality of values, e.g., each data element may be one-dimensional or multi-dimensional.

A value or "actual value" of a data element refers to a value that is actually stored by or contained in the data element. This is distinguished from a "predicted value" of the data element, which instead refers to a prediction of the actual value (e.g., not the actual value itself), and is typically determined based on values of other data elements in the dataset.

The term "outlier" may be used interchangeably with the term "anomaly".

Figure 3:
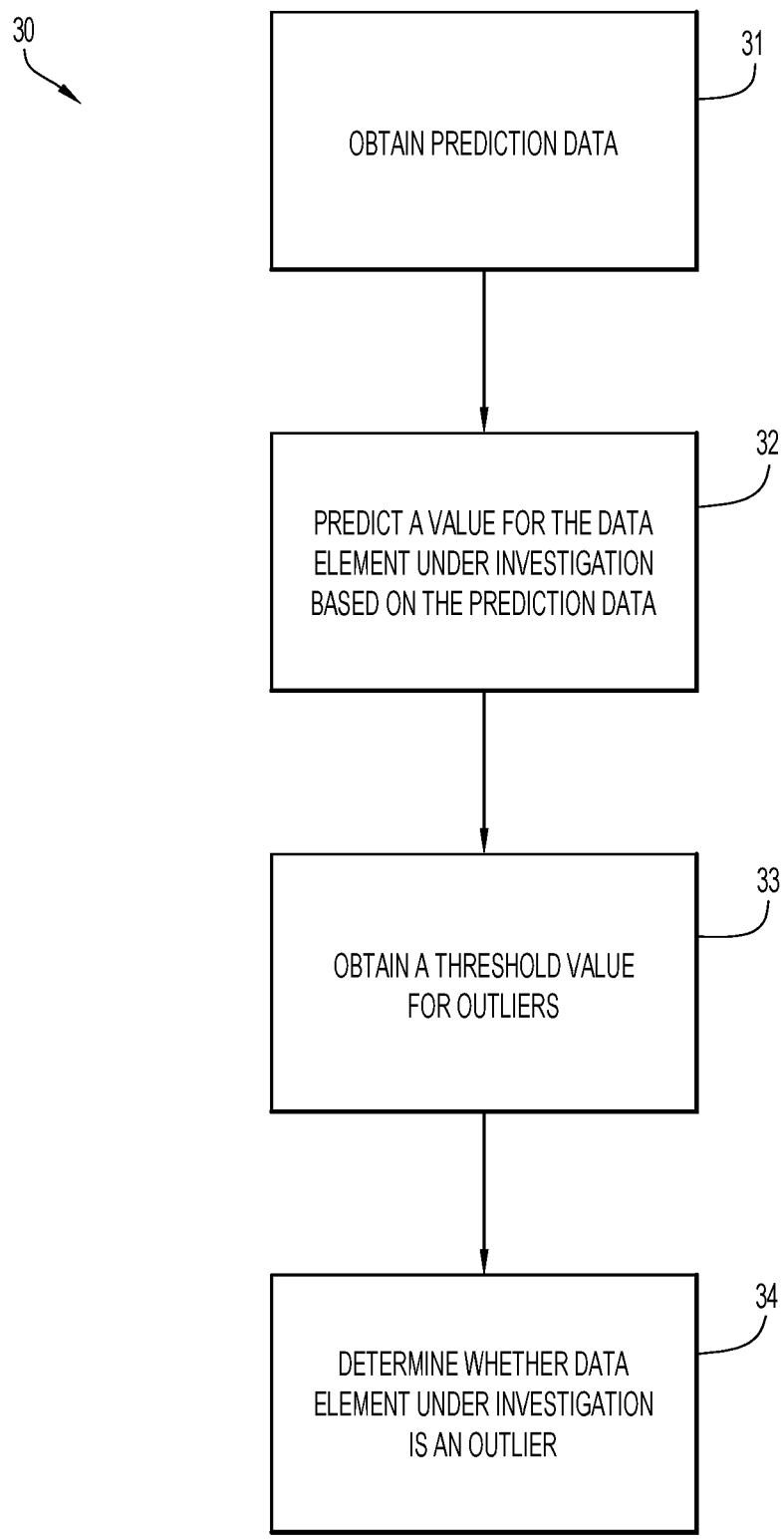
FIG. 3 is a flow diagram of a method according to an embodiment of the present invention.

FIG. 3 illustrates a flow diagram of a method 30 for determining whether a data element (e.g., the "data element under investigation" or "current data element") is an outlier, according to an embodiment of the present invention. Different examples of the inventive concept utilize and improve upon this embodiment.

The method 30 begins with step 31, which comprises obtaining prediction data for predicting a value of the data element. In particular, the step 31 comprises obtaining the prediction data from first data of the time-series dataset that temporally precedes the data element. Thus, the step 31 obtains the prediction data from data located earlier in the time-series dataset than the data element under investigation.

By way of example, step 31 may comprise obtaining a plurality of data elements temporally preceding the data element under investigation in the data series. This may referred to as a 'look-back' operation. The number of data elements obtained may vary from application to application, but preferably comprise no fewer than 3 data elements and/or no more than 20 data elements. Preferably, the data for predicting a value of the data element (under investigation) comprises data elements that immediately (and temporally) precede the data element under investigation.

The prediction data obtained in step 31 may therefore comprise a plurality of data elements of the time-series dataset, each data element of the first data temporally preceding the data element under investigation. Similarly, the first data, from which the prediction data is obtained, may comprise a plurality of data elements of the time-series dataset, each data element of the first data temporally preceding the data element under investigation.

The method 30 then moves to step 32, which comprises predicting a value or values for the data element (under investigation) based on the prediction data. Thus, step 32 generates a predicted value for the data element under investigation, which is distinguished from the actual value (e.g., the recorded or stored value) of that data element.

The step 32 preferably comprises applying a prediction model to the prediction data to thereby predict a value or values for the data element under investigation. Other embodiments for step 32 will be elucidated later.

Any (one or more) suitable prediction models may be used in step 32. Known prediction models for predicting a value of data include long-short term memory (LSTM), autoregressive integrated moving average (ARIMA) and triple exponential smoothing, also known as Holt-Winters (HW). The choice of a prediction model may vary depending upon characteristics of the time-series dataset. For instance, deep neural network prediction methods, such as LSTM, may provide the best results given large training data (e.g., a large amount of prediction data), whereas given small datasets, ARIMA and HW may provide better forecasts. It will be appreciated that other models may be used.

A prediction model may be a time-series forecasting (TSF) model. The output of a TSF model is a one-step ahead prediction that identifies/predicts what the value is expected to be at the next timestamp—e.g., for the data element under investigation.

After step 32, the method 30 proceeds to step 33, which comprises obtaining a threshold value for defining values for the data element that are considered outliers. Thus, the obtained threshold value can be used to determine whether the actual value of the data element is an outlier (with reference to at least the predicted value of that data element).

Following step 33, the method 30 proceeds to step 34. Step 34 comprises determining whether the data element (under investigation) is an outlier based on the threshold value, the predicted value and the (actual) value of the data element. Thus, it can be determined whether a data element is an outlier based, for example, on at least a comparison between the predicted value and the (actual) value of that data element with reference to the threshold value.

In particular, step 34 may comprise calculating an error value using the predicted value and the (actual) value of the data element under investigation. This error value may be compared to the threshold value to determine whether the data element is an outlier (e.g., anomalous) or not. For example, if the error value of the data element under investigation is above the threshold value, it may be determined that the data element is an outlier. Similarly, if the error value of the data element under investigation is below the threshold value, it may be determined that the data element is not an outlier.

By way of example, (a magnitude of) a difference between the (actual) value and predicted value of the data element under investigation may be used as the error value. In another example, a specific error calculation is made (e.g., RMS error calculation, squared error calculation or scaled squared error calculation) using the (actual) value and the predicted value of the data element under investigation to generate the error value.

Thus, generally speaking, an "error value" represents a difference between a predicted value and an actual value of a data element. Numerous methods of obtaining an error value, representing such a difference, would be known to the skilled person.

The threshold value may indicate an upper limit of error values considered to lie within a normal or non-outlying range. Thus, the threshold value may indicate a maximum allowable error value considered to not be an outlier. In this way, an error value greater than the threshold value indicates that the data element associated with that error value is an outlier.

In other examples, the threshold value may indicate upper and lower bounds of a range of (actual) values of a data element that are not considered to be outliers, where any values falling outside of this range are considered to be outliers.

In another example, step 34 comprises adding the threshold value to the predicted value of the data element under investigation to define an upper bound of a range of values not considered to be outliers, and subtracting the threshold value from the same predicted value to define a lower bound of a range of values not considered to be outliers. Any values falling outside of the upper and lower bounds may be labelled outliers or anomalies. In this way, the threshold value may define a range of acceptable, non-outlying values for the data element relative to the predicted value.

Having identified, in step 34, whether the data element is anomalous, the method may comprise a step of signaling the data element under investigation is anomalous (e.g., trigger an alert, generate a particular set of data and so on). This signaling may be used to flag or identify an anomalous data element. If an anomalous data element is identified, methods employing anomalous data element detection may choose to ignore the anomalous data element or request that the anomalous data element be resent (e.g., in case the anomaly is caused by noise or the like). Other uses for an anomaly detection method herein described will be apparent to the skilled person.

It is envisaged that the method 30 can be iteratively applied to different data elements of the time-series dataset, to identify whether different data elements are outliers. A new threshold value may be calculated each time the method 30 is performed, e.g., for each different data element investigated. Thus, for example, the method may be iteratively performed (e.g., by a system) for each data element, with a different threshold value being determined for each data element (e.g., the threshold value is dynamic).

It will be clear that embodiments of the present invention may be adapted for determining whether a multi-dimensional (e.g., comprising more than one value) data element is an outlier.

In such embodiments, step 32 may comprise predicting a corresponding, e.g., identical, number of prediction values for the data element as there are (actual) values of that data element. Similarly, step 34 may comprise calculating an error value using the prediction values and the (actual) values of the data element, for comparison to the threshold value. Thus, a data element may be associated with a plurality of (actual) values and a respective plurality of predicted values, from which a single error value may be calculated for comparison with the threshold value.

Other methods of adapting the proposed concept for multi-variate data will be readily apparent to the person skilled in the art. For example, in embodiments of the present invention, each value of a multi-dimensional data element under investigation may be individually assessed to determine whether it is an outlier (e.g., using a method herein described). In the event that one or more values of the multi-dimensional data element are identified as outliers, the overall data element may be considered an outlier/anomaly.

Thus, embodiments of the present invention may be readily modified by the skilled person for multi-dimensional data elements associated with more than one value.

Figure 4:
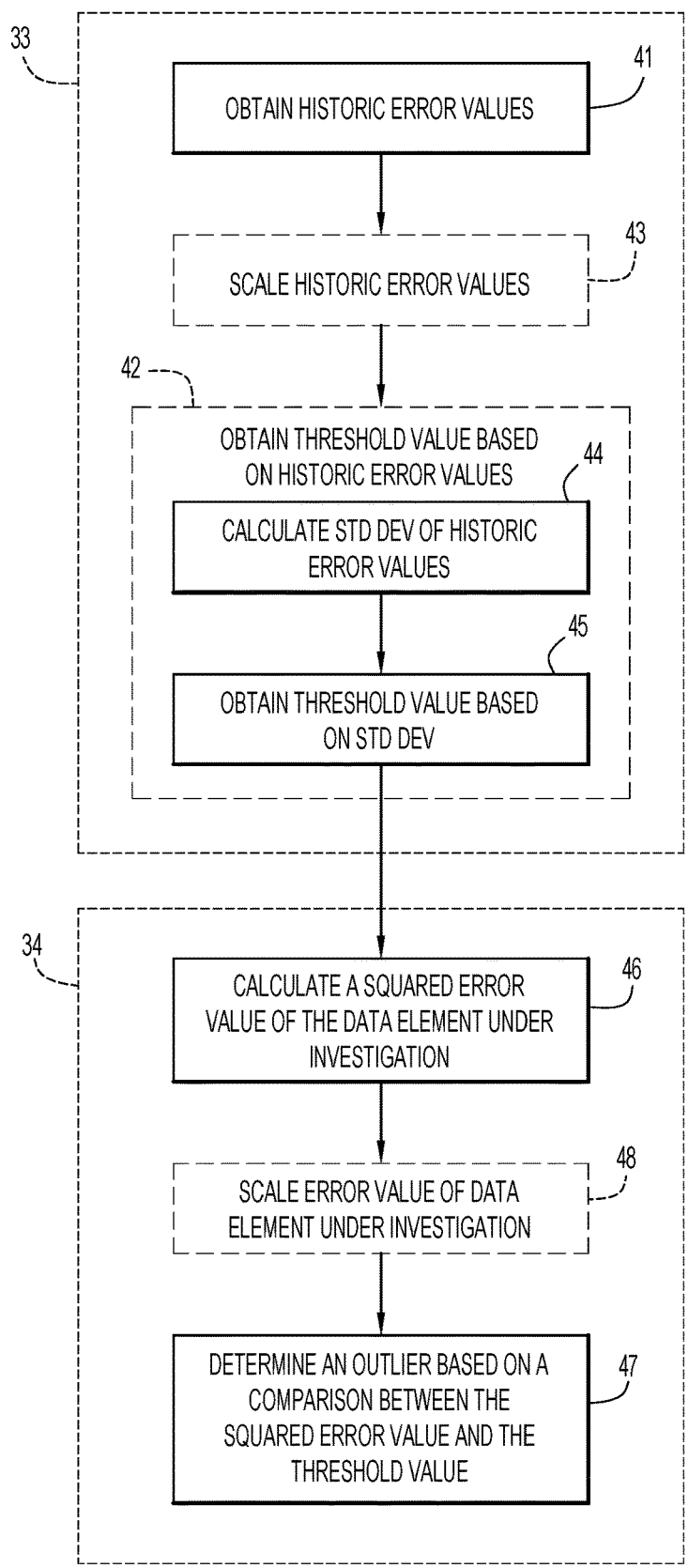
FIG. 4 is a flow diagram of a part of the method of FIG. 3 according to an embodiment of the present invention.

FIG. 4 illustrates embodiments of step 33 for obtaining the threshold value and step 34 for determining whether a data element under investigation is an outlier.

The illustrated embodiment of step 33 comprises a number of separate sub-steps.

A first sub-step 41 of step 33 comprises obtaining historic error values for the time-series dataset. Each historic error value is representative of a difference between at least one value of a second data element of the time-series dataset that temporally precedes (e.g., is before or is earlier in the time-series dataset than) the data element under investigation and at least one corresponding predicted value of that second data element. In other words, a historic error value represents a difference between the predicted value(s) and the corresponding actual value(s) of a previous data element in the time-series dataset. A historic error value may alternatively be labelled a previous error value.

Thus, a plurality of "second data elements" of the time-series dataset, being data elements that temporally precede the data element under investigation, each contribute a respective historic error. Preferably, these second data elements are data elements that precede the data element (under investigation) in the time-series dataset. For example, the second data elements may comprise data elements that immediately precede the data element under investigation.

The sub-step 41 may comprise obtaining a predicted value for each second data element in a same way as a predicted value for the data element under investigation. That is, data elements of the dataset that precede a particular second data element in the time-series dataset may be used to predict a value of the second data element.

The sub-step 41 may comprise obtaining the historic error values, for example, from a stored set of historic error values. The stored set of historic error values may therefore contain error values for data elements temporally preceding the data element under investigation in the time-series dataset.

The number of historic error values obtained in sub-step 41 may vary depending upon the embodiment. In one embodiment of the present invention, the number of historic error values obtained is no less than 5. In another embodiment of the present invention, the number of historic error values is no less than 10. In other preferable embodiments of the present invention, the number of historic error values is no less than 20 or 50. In yet other embodiments of the present invention, the number of historic error values is no less than 100 or 200. In yet other embodiments of the present invention, all previous data elements (to the data element under investigation) are associated with a historic error value, and all error values are obtained in sub-step 41. The greater the number of historic error values, the greater the accuracy in identifying outliers, as the threshold value will more accurately represent a historic error margin of a prediction (e.g., be more indicative of a datasets characteristics).

A second, subsequent sub-step 42 of step 33 comprises obtaining a threshold value based on the historic error values.

In this way, the threshold value for determining whether a data element under investigation is an outlier is determined based on previous/historic error values of data elements that temporally precede the data element under investigation in the time-series dataset.

Preferably, each historic error value, obtained in sub-step 41, is a squared error value, being the square of the difference between the (actual) value(s) and the predicted value(s) of a respective second data element of the time-series dataset that temporally precedes the data element.

For data elements comprising a plurality of values, e.g., multi-dimensional data elements, the historic error value may be a mean squared error of the second data element. Thus, each second data element may be associated with a plurality of (actual) values and a respective plurality of predicted values, where a single error value—the historic error value—is calculated using the pluralities of actual and predicted values. Other methods of adapting for multi-variate data will be apparent to the person skilled in the art.

The use of squared error values in the calculation of the threshold value provides a more accurate and precise method of identifying whether a data element is an outlier.

In other examples, a historic error value may be a difference between the (actual) value and predicted value of a respective second data element of the time-series dataset that temporally precedes the data element under investigation. Other examples of appropriate error values for use as a historic error value will be readily apparent to the skilled person (e.g., RMS values, logarithmic errors and so on), and methods for calculating the same will also apparent to the skilled person. Preferably, the historic error value is based on a magnitude of the difference or otherwise comprises only positive values (such as squared values), e.g., it is unsigned or signless.

In embodiments of the present invention, step 33 may further comprise a sub-step 43 of scaling each historic error value to a value between 0 and 1, e.g., based on the maximum value of the historic error values obtained in step 41. Thus, sub-step 43 may comprise determining a maximum value of the historic error values obtained in step 41, and scaling each historic value based on this maximum value (e.g., dividing each historic error value by the maximum value of the historic error values).

In another example, each historic error value is scaled in sub-step 43 based on a maximum value of any the historic error values and a corresponding error value of the data element under investigation (e.g., an error value of the data element calculated in a same manner as each historic error value). This ensures consistency in the anomaly identification process.

In some embodiments of the present invention, the number of historic error values is equal to the number of data elements, temporally preceding the data element under investigation, in the time-series dataset. Thus, each data element in the time-series dataset that precedes the data element under investigation may provide a historic error value. This increases the accuracy of the anomaly detection mechanism at the expense of processing efficacy and cost.

In the illustrated embodiment, the sub-step 42, for obtaining the threshold value, comprises performing sub-step 44 and sub-step 45 in sequence.

Sub-step 44 comprises calculating the standard deviation of the historic error values obtained in step 41. This is performed using conventional standard deviation calculation methodologies.

Sub-step 45 comprises obtaining the threshold value based on the calculated standard deviation. In particular, sub-step 45 may comprise multiplying the standard deviation by a predetermined value, and basing the threshold value on the result.

Where the historic error values are positive numbers only (e.g., each error value is a magnitude of an error or squared error value), sub-step 45 may comprise multiplying the standard deviation by a predetermined value (e.g., 3 or 5) to directly obtain the threshold value.

When the historic error values comprise both positive and negative numbers (e.g., when the error values are not a squared error value or a magnitude of an error value), then the mean of the historic error values may also be used to define the threshold value. In particular, the product of the predetermined value (e.g., 3 or 5) and the standard deviation can be added to the mean of the historic error values to define the threshold value.

This provides a highly accurate and adaptable dynamic threshold value.

Preferably, the predetermined value is no less than 3, for example, no less than 5. As the predetermined value increases, the false positive rate of detecting outliers decreases and the false negative rate of detecting outliers increases. A predetermined value of 5 has shown to provide particularly accurate and reliable detection of outliers. However, the predetermined value can be defined as 3 if the underlying (historic) errors can be represented by or assumed to be a normal or half-normal distribution.

It will be well appreciated by the skilled person that the predetermined value, used to calculate the threshold value, may depend upon the definition of an outlying data element. For example, in one embodiment of the present invention, a data element is considered an outlier if it has an error value that does not fall within a range for which a predetermined percentage of all error values are expected to fall. The predetermined percentage may, for example, be 95%, 99%, 99.5%, 99.7% and so on. A user may provide this predetermined percentage, from which the predetermined value is calculated using standard procedures.

Thus, the predetermined value, and therefore the threshold value, may depend upon a percentage of error values expected to be outliers (e.g., 5%, 1%, 0.5%, 0.3% and so on).

Put another way, a data element may be considered an outlier if it is associated with an error value that does not fall within a range for which a predetermined percentage of error values (of any data element in the time-series dataset) are expected to fall.

For half-normally distributed error values, it can be assumed that 95% of all error values fall within 2 standard deviations of 0, and 99.7% of error values fall within 3 standard deviations of 0. For normally distributed error values, it can be assumed 95% of all error values fall within 2 standard deviations of the mean (of the historic error values), and 99.7% of error values fall within 3 standard deviations of the mean (of the historic error values).

Consider a scenario in which each historic error value is a squared error value, the historic error values can be assumed to have a normal distribution, and an outlier is defined as a data element for which the associated error value does not fall within the normal expected bounds of 99.7% of data elements. In this example, the predetermined value will be 3, and the threshold value will be 3 times the standard deviation.

It will be seen that the predetermined value may therefore depend upon the probability of a data element having a value that is outlying or within normal bounds.

However, in order to ensure the method is not bound to the underlying distribution of the historic errors, it is possible to leverage Chebyshev's inequality. In contrast to the 68-95-99 rule, also referred to as the empirical rule which applies to normal distributions only, the Chebyshev's inequality guarantees that, for a wide class of probability distributions, no more than a certain fraction of values can be more than a certain distance from the mean or 0 (for only positive error values).

Thus, the predetermined value may be calculated using the principle of Chebyshev's inequality to determine how many standard deviations away a value must be to be considered an outlier.

This may be based on the definition of what constitutes an outlying error value. For example, an error value may be defined as an outlying error value if it is greater than a threshold value for which it is expected that at least a predetermined percentage of error values will fall below. The predetermined percentage $p_1$ may vary depending upon the application (e.g., from a user-input value), such as 95%, 99% or 99.5%.

In an embodiment of the present invention, where k is the predetermined number and $p_1$ is the predetermined percentage (expressed as a decimal), the predetermined number may be calculated by performing:

$$k = \frac{1}{\sqrt{(1-p_1)}} \qquad (1)$$

The predetermined percentage $p_1$ represents the percentage of error values that are considered to lie within of a normal range, e.g., are not associated with outlying data elements. Thus, the formulation $1-p_1$ represents the percentage of error values (e.g., for the entire dataset) that are considered to lie outside a normal range—e.g., are associated with outlying elements. This percentage value may differ from application to application.

This significantly improves identification of an appropriate threshold value for determining whether a data element is an outlier, thereby improving an accuracy and precision in identifying an outlying data element. The versatility of methods employing Chebyshev's inequality is greater than those assuming a normal distribution of error values.

In other embodiments of the present invention, sub-step 42 may use other algorithms to generate the threshold value. For example, sub-step 42 may comprise determining a mean/median/mode of the historic error values, and using this value to define the threshold value. For example, the mean/median/mode may be multiplied by a predetermined number (e.g., no more than 2, such as around 1.5) to provide a threshold value.

However, preferred embodiments of the present invention comprise utilizing both sub-step 43 and a sub-step 42 comprising the described sub-steps 44, 45. In such embodiments, the threshold value is calculated based on a standard deviation of the scaled historic error values. This preferred embodiment provides extremely accurate and precise identification of outlying data elements.

Step 34, for determining whether the data element (under investigation) is an outlier, may depend upon the calculation used to generate the threshold value in step 33. In other words, the methodology of step 34 can complement the methodology of step 33 for generating the threshold value.

In typical embodiments of the present invention, an error value of the data element under investigation is calculated in an identical manner to each historic error value of second data elements temporally preceding the data element under investigation in the time-series dataset. This error value is compared to the threshold value generated using the historic error values.

For example, consider a scenario in which the threshold value calculated in step 33 is based upon squared error values of historic data (e.g., second data elements temporally preceding the data element under investigation). Step 34 may comprise a corresponding sub-step 46 of calculating a squared error value of the data element under investigation and a corresponding sub-step 47 of determining whether the data element is an outlier based on a comparison between the squared error value (of that data element) and the threshold value.

In another example, consider a scenario in which step 33 comprises a sub-step 43 of scaling the historic error values. Step 34 may comprise a corresponding sub-step 48 of scaling the error value of the data element (e.g., so that it is scaled to correspond to the historic error values). In such embodiments, the sub-step 48 preferably comprises scaling the error value of the data element under investigation using a same maximum value of the historic error values used to scale the historic error values. Thus, the historic error values and the error value under investigation can be normalized in a same manner.

In this way, an error value of the data element under investigation may correspond to the historic error values used to calculate the threshold value, in that it is calculated in a similar manner and is scaled to correspond to the historic error values.

It is envisaged that the above-described embodiments may be applied iteratively to different data elements of the time-series dataset. In this way, a different threshold value can be calculated for each data element investigated, e.g., at each time step of a time-series dataset, so that each data element can be individually assessed to determine whether it is an outlier.

In some embodiments of the present invention, the calculated error value of the data element under investigation is stored for a future iteration of the method, e.g., to act as a historic error value in a future iteration. Thus, the calculated error value of the data element may be appended to a set of stored historic error values.

In preferable embodiments of the present invention, the historic error values obtained in step 41 are associated with second data elements corresponding to a particular window of time. As previously explained, data elements of a time-series dataset are associated with a particular point or period of time (e.g., they are associated with at least one timestamp). Accordingly, each historic error value can also be associated with a particular point or period of time (e.g., they are also associated with at least one timestamp). It is therefore possible to select historic error values associated with a particular window of time, e.g., relative to a timestamp of a data element under investigation.

Preferably, a timestamp associated with a historic error value falls within a fixed window of time that lies a predetermined length of time from the timestamp associated with the data element under investigation. For example, the step 41 may comprise obtaining historic error values that fall within a 10 minute window centered around a time (e.g., ±5 minutes) 1 hour before a timestamp of the data element under investigation.

In an embodiment of the present invention, each historic error value obtained in step 41 may be associated with a window of time that lies a multiple of a predetermined time period prior to the time associated with the data element under investigation.

By way of example, consider a scenario where a predetermined time period is an hour, a fixed time window is 10 minutes in length and the data element under investigation is associated with a timestamp of 10:00:00. In this scenario, a timestamp associated with historic error values obtained in step 41 may fall within any of the following windows: 09:00:00 (±0:05:00); 08:00:00 (±0:05:00); 07:00:00 (±0:05:00); and so on.

The length of the fixed time window may depend upon the length of the predetermined length of time from the timestamp associated with the data element under investigation. For example, the length of the time window may be a multiple (e.g., 0.01×) of the predetermined length of time from the timestamp.

The length of the predetermined length of time is preferably an hour, a day or a week. This allows for patterns in the time-series dataset, which are typically associated with such time periods, to be exploited. This improves a precision and reliability of detecting outliers by taking into account periodic patterns in the time-series dataset.

Embodiments of the present invention may also comprise a step of identifying periodic patterns in the historic error values of the entire time-series dataset. This may, for example, be performed using a pattern recognition algorithm or program or a frequency analysis method (e.g., employing a Fourier transform). Identifying periodic patterns in the historic error values allows for historic data values associated with periodic time windows (e.g., into which a timestamp of the data element under investigation falls) to be obtained.

In other embodiments of the present invention, the obtained historic error values correspond to error values of data elements that immediately precede (e.g., without any intermediate data elements) the data element under investigation in the time-series dataset. Thus, for example, the data element of the time series dataset that immediately follows the latest or last of the second data elements is the data element under investigation.

Embodiments of the present invention enable extreme value analysis by computing a dynamic threshold for each data element of the time-series dataset. Such embodiments may comprise a step of determining a distance between an actual value of a data element to a predicted value for that data element and, when the distance is above the dynamic threshold, reporting the actual value of the data element as anomalous.

In such embodiments, the distance is preferably the squared error between the actual and predicted value normalized (e.g., scaled) between 0 and 1. The dynamic threshold can be computed individually for each data element (e.g., at different time steps of the time-series dataset), based on historic error values associated with previous data elements of the time-series dataset. Even more preferably, the dynamic threshold is based on historic squared errors that have been normalized (e.g., scaled) between 0 and 1.

This provides a particularly accurate and precise method of identifying outlying data elements or when a data element is associated with one or more outlying values.

Figure 5:
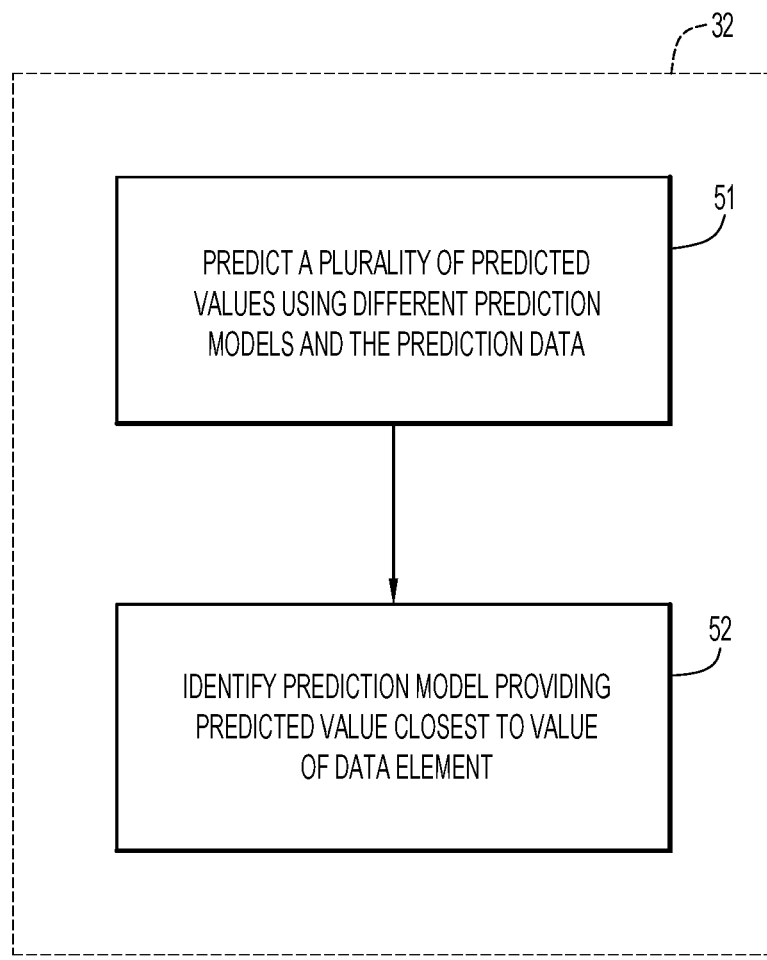
FIG. 5 is a flow diagram of a part of the method of FIG. 3 according to another embodiment of the present invention.

FIG. 5 illustrates embodiments of step 32, of method 30, for predicting a value of the data element (under investigation) based on prediction data. This method is preferably employed with the embodiment described with reference to FIG. 4. However, it is envisaged that the method of FIG. 5 alone, employed alongside the embodiment of FIG. 3, can improve the accuracy of identifying outlying data elements.

Step 32 comprises a sub-step 51 of predicting, using the prediction data and a plurality of different prediction models, a respective plurality of predicted values for the data element. Thus, multiple prediction models are each used to predict a respective value of the data element.

Suitable prediction models for predicting a value of a data element are well known to the skilled person, such as those previously set out. Typically, a prediction model takes a plurality of previous data elements as input, and processes these data elements to predict a value for a subsequent data element. Thus, the prediction data used by the prediction model preferably comprises a plurality of data elements that temporally precede the data element under investigation.

Of course, if the data element under investigation is multi-dimensional, therefore comprising more than one data value, each prediction model may predict a respective set of prediction values for the data element.

Step 32 then moves to a sub-step 52 of identifying, from the plurality of predicted values, the prediction model that provides a prediction value(s) closest to the value(s) of the data element. The prediction value that is closest to the value of the data element is used in the subsequent steps of method 30 in the determination of whether the data element is an outlier.

Preferably, the sub-step 52 comprises calculating a root mean square (RMS) error between each of the plurality of predicted values for the data element and the (actual) value(s) of the data element. The predicted value(s) associated with the lowest RMS error is selected as the predicted value for future steps.

In another example, the step 32 instead comprises using a plurality of prediction models to predict the overall time series dataset preceding the data element under investigation. The prediction model that generates a time series dataset closest to the actual time series dataset (e.g., as determined using an RMS analysis) is selected to generate the prediction value for the data element under investigation.

Step 32 may therefore comprise utilizing a deep learning mechanism for identifying which of a plurality of prediction models best predicts a value for a data element or best models an overall time-series dataset.

The present invention embodiments recognize that, if none of a plurality of prediction models has managed to accurately predict the value of the data element under investigation, then it is more likely that the data element is an anomaly or outlier. Thus, by using a prediction value (of a plurality of possible prediction values) that is closest to the actual/measured value of the data element, an accuracy and reliability of identifying anomalous data elements can be increased.

Moreover, using a plurality of prediction models and selecting the best of these means that embodiments do not need to rely on a specific time-series forecasting model—e.g., prediction model—which would otherwise affect the maximum efficacy of the method of identifying an outlying data element. In particular, different time-series datasets may be better modelled or more accurately modelled by certain prediction models than others. By using a plurality of prediction models, the most appropriate model can be identified, thereby reducing the likelihood that a data element will be misidentified as an outlier.

Particularly advantageous embodiments of the present invention employ both the steps 33 described with reference to FIGS. 4 and 32 described with reference to FIG. 5. However, it will be apparent that these two concepts (e.g., of FIG. 4 and of FIG. 5) may be considered separately from one another.

Thus, there may be proposed a method comprising the steps described with reference to FIG. 3 and FIG. 5 (e.g., and not necessarily including the steps described with reference to FIG. 4).

Figure 6A:
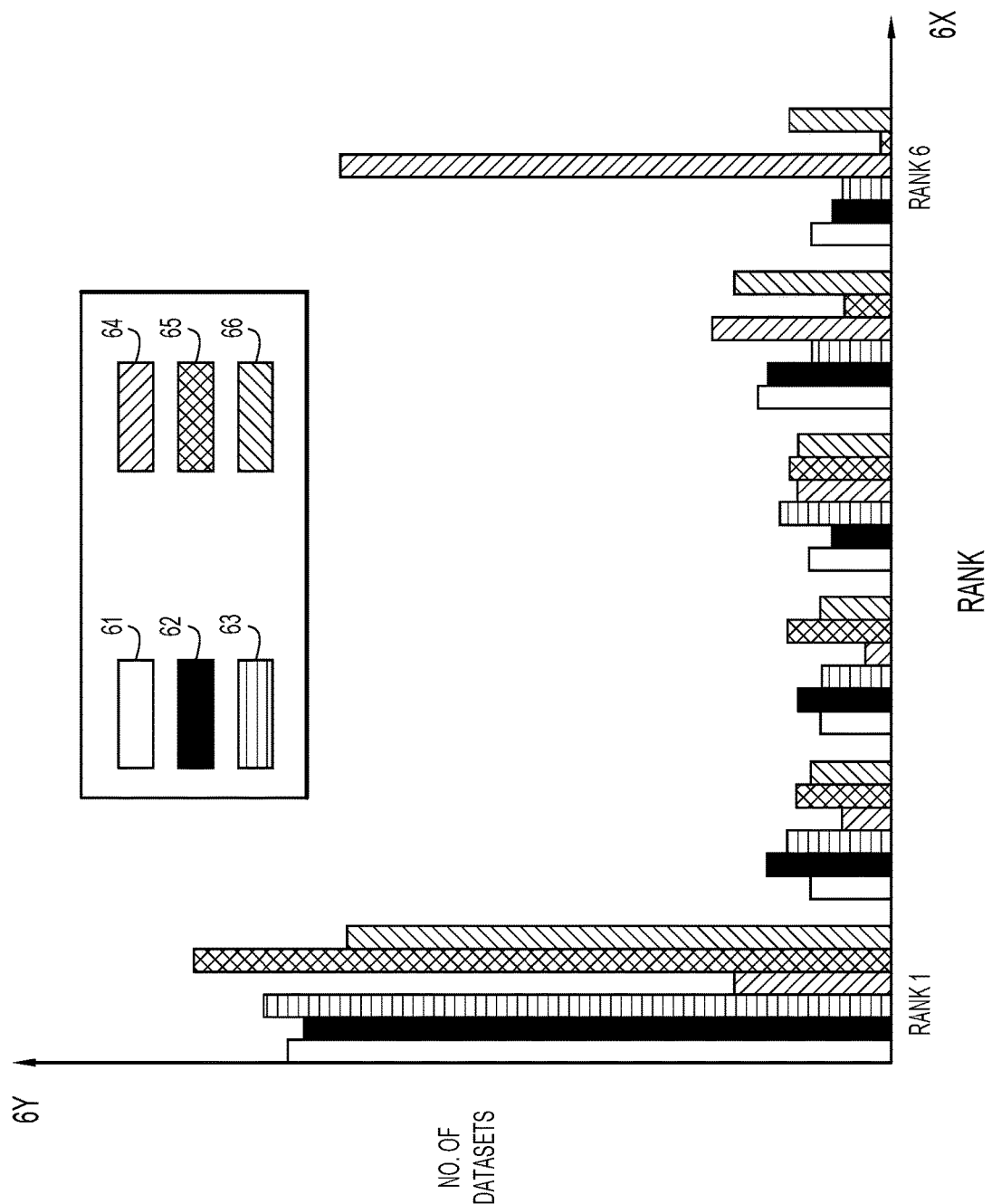
FIGS. 6A-6D are figures illustrating the efficacy of methods according to different embodiments of the present invention.

FIG. 6A is a graph that illustrates the efficacy of the proposed embodiments of the present invention in comparison to related art. Benchmark tests were performed upon each data element of a plurality of different datasets using six different methods of identifying an outlying data element. Five of these methods (61, 62, 63, 65, 66) conform to a proposed embodiment of the invention. The sixth method 64 corresponds to a method of the related art.

The first method 61, according to an embodiment of the present invention, comprises performing a method as described with reference to FIGS. 3 and 4 (e.g., using historic error values to calculate a threshold value), where the prediction model, for predicting a value of the data element, used in step 32 is an ARIMA model.

A second method 62, according to an embodiment of the present invention, comprises performing a method as described with reference to FIGS. 3, 4 and 5. Thus, the second method 62 uses historic error values to calculate the threshold value. Step 32 of method 62 comprises predicting, using the prediction data and a plurality of different prediction models, a respective plurality of potential predicted values for the data element; and assigning the potential predicted value that is closest to the value of the data element as the predicted value.

A third method 63, according to an embodiment of the present invention, also comprises performing a method as described with reference to FIGS. 3, 4 and 5. Thus, the third method 63 uses historic error values to calculate the threshold value. Step 32 of method 63 comprises predicting, using the prediction data and a plurality of different prediction models, a respective plurality of potential predicted values for a plurality of data elements of the dataset; and selecting the prediction model that generates predicted values that most closely match the (actual) values of the associated plurality of data elements of the dataset to generate the prediction value for the data element.

A fourth method 65, according to an embodiment of the present invention, comprises performing a method as described with reference to FIGS. 3 and 4 (e.g., using historic error values to calculate a threshold value), where the prediction model, for predicting a value of the data element, used in step 32 is a single LSTM (LSTM-S) prediction model.

A fifth method 66, according to an embodiment of the present invention, comprises performing a method as described with reference to FIGS. 3 and 4 (e.g., using historic error values to calculate a threshold value), where the prediction model, for predicting a value of the data element, used in step 32 is a deep LSTM (LSTM-D) prediction model.

The method 64, according to the related art, comprises performing outlier detection using the conventional EGADS model.

FIG. 6A illustrates the number of datasets for which each of the six methods 61-66 scored a rank between 1 and 6, where rank 1 represents the best method and rank 6 represents the worst method for identifying outliers in a particular dataset of a given dataset.

To assess a relative rank of a method, an $F_1$ score of each model was calculated, with the method associated with the highest $F_1$ score being assigned Rank 1, and the method with the lowest $F_1$ score being assigned Rank 6. The other ranks, e.g., Ranks 2-5, are distributed therebetween accordingly.

In other words, for each of a plurality of benchmark datasets, the methods 61-66 are applied to each data element of that dataset, and subsequently ranked based on a ranking assessment method. Here, the ranking assessment method comprises calculating an $F_1$ score of each method, and ranking the methods based on a magnitude of the $F_1$ score.

The y-axis 6Y indicates the number of datasets for which a method received a particualr rank. The x-axis 6X indicates the rank.

The $F_1$ score is defined by the following equation:

$$F_1 score = 2 \times \frac{\text{precision} \times \text{recall}}{\text{precision} + \text{recall}} \quad (2)$$

where the "precision" is defined as the number of true anomalies discovered in a given dataset, divided by the total number of anomalies discovered in the dataset and the "recall" of a technique is defined as the number of true anomalies discovered in the dataset, out of the total number of true anomalies in the dataset.

The tested datasets have a known number of anomalies (e.g., they are benchmark datasets), so that an efficacy of a particular method can be readily ascertained.

It will be clearly seen that the methods according to the present invention embodiments rank, on average, higher than the method according to the related art.

Figure 6B:
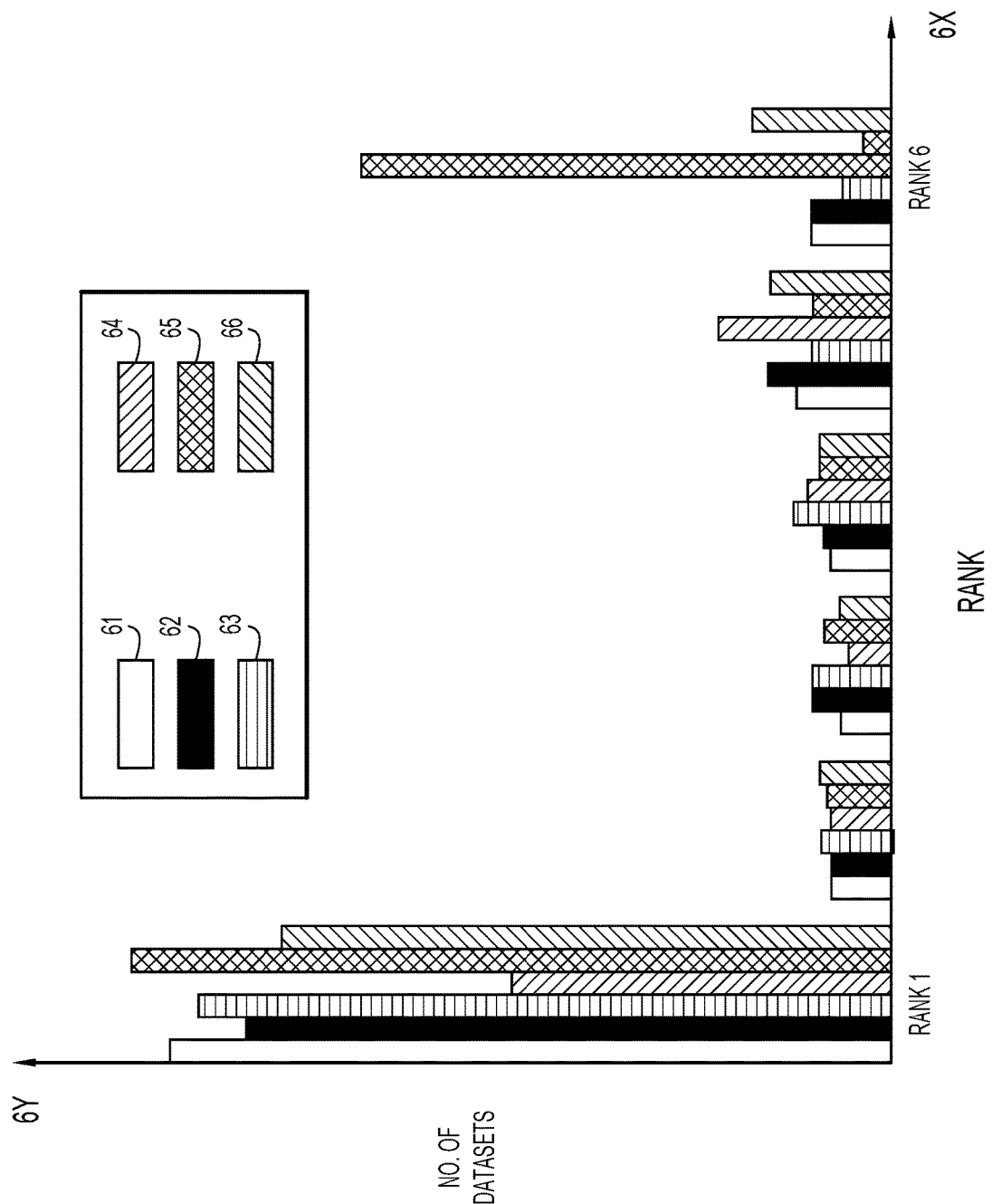
Figure 6C:
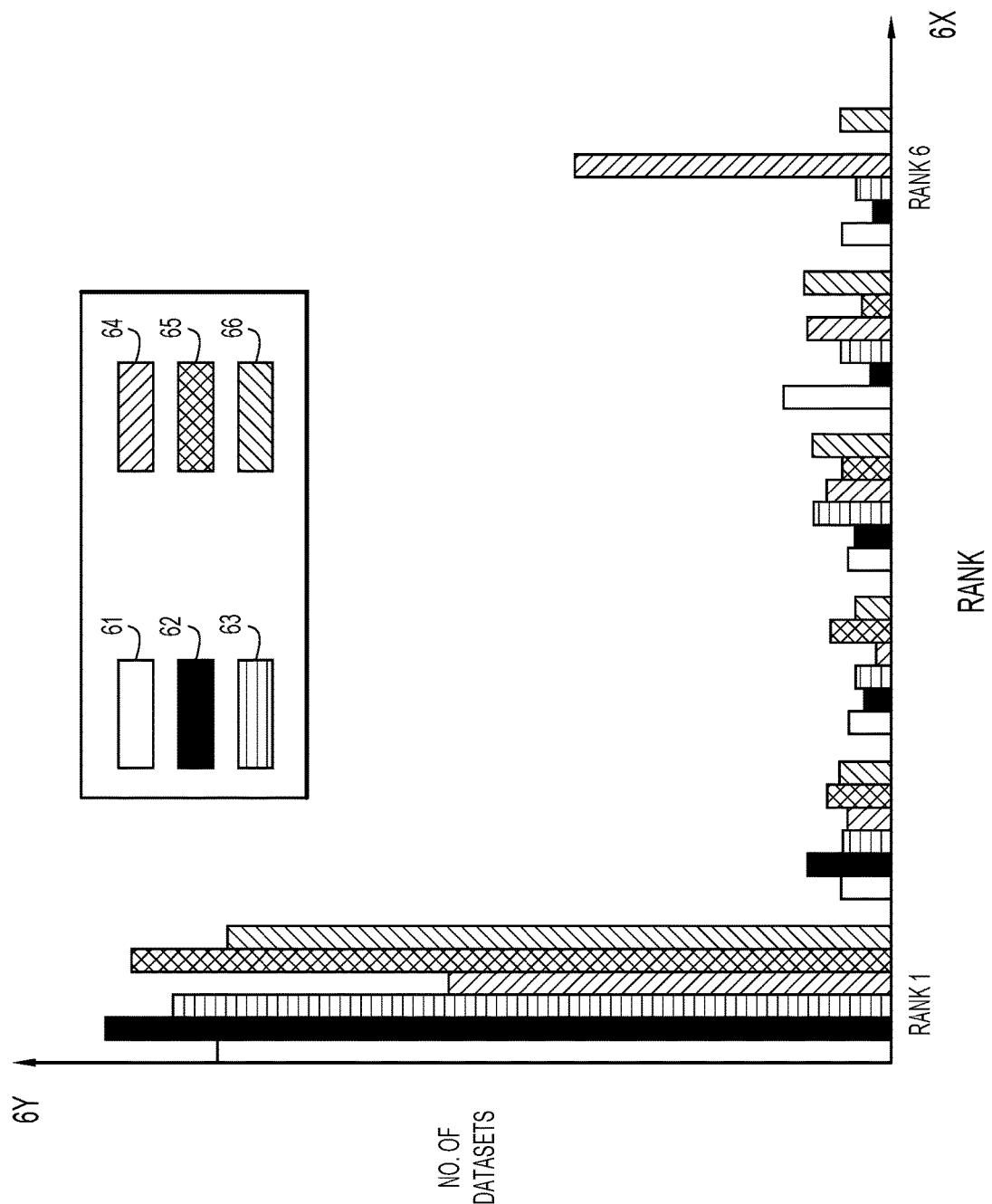
Figure 6D:
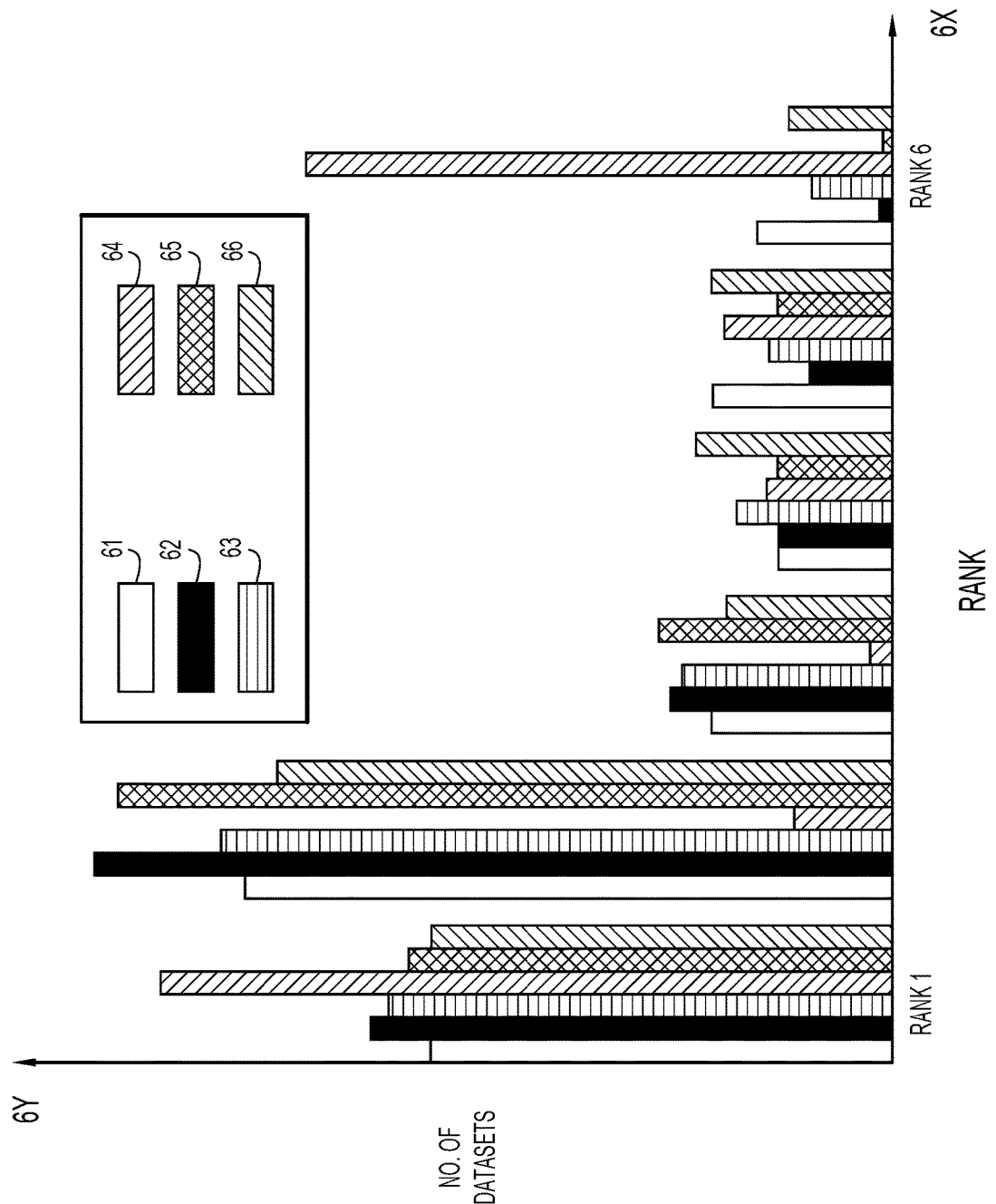

FIGS. 6B to 6D show other graphs illustrating a relative ranking of the above-identified methods, performed on the same plurality of datasets, with reference to other ranking assessment methods.

As before, for each of a plurality of datasets, the methods 61-66 are applied and ranked based on a ranking assessment method. The total number of times a method receives a particular rank is summed, and displayed in the FIGS. 6A-6D. FIGS. 6A-6D therefore illustrate the summed ranks of each method, as ranked according to different methodoligies.

In FIG. 6B, a relative rank of a model is assessed by calculating a precision of each model, with the method associated with the highest $F_1$ score being assigned Rank 1, and the method with the lowest $F_1$ score being assigned Rank 6. The other ranks are distributed between the remaining methods accordingly. "Precision" is defined as the number of true anomalies discovered in a given dataset, divided by the total number of anomalies discovered in the dataset.

In FIG. 6C, a relative rank of a model is assessed by calculating a recall of each model, with the method associated with the highest $F_1$ score being assigned Rank 1, and the method with the lowest $F_1$ score being assigned Rank 6. The other ranks are distributed between the remaining methods accordingly.

In FIG. 6D, a relative rank of a model is assessed by calculating a conventional ED score of each model, with the method associated with the highest $F_1$ score being assigned Rank 1, and the method with the lowest $F_1$ score being assigned Rank 6. The other ranks are distributed between the remaining methods accordingly.

FIGS. 6A-6D clearly show that embodiments of the present invention are ranked consistently higher than related art methods for identifying outliers. For example, FIG. 6D shows how a related art method deviates from performing well to performing poorly, which is avoided by using an embodiment of the present invention.

In some embodiments of the present invention, there may be provided a system comprising a processing arrangement adapted to carry out any method previously described with reference to FIGS. 3 to 5.

Figure 7:
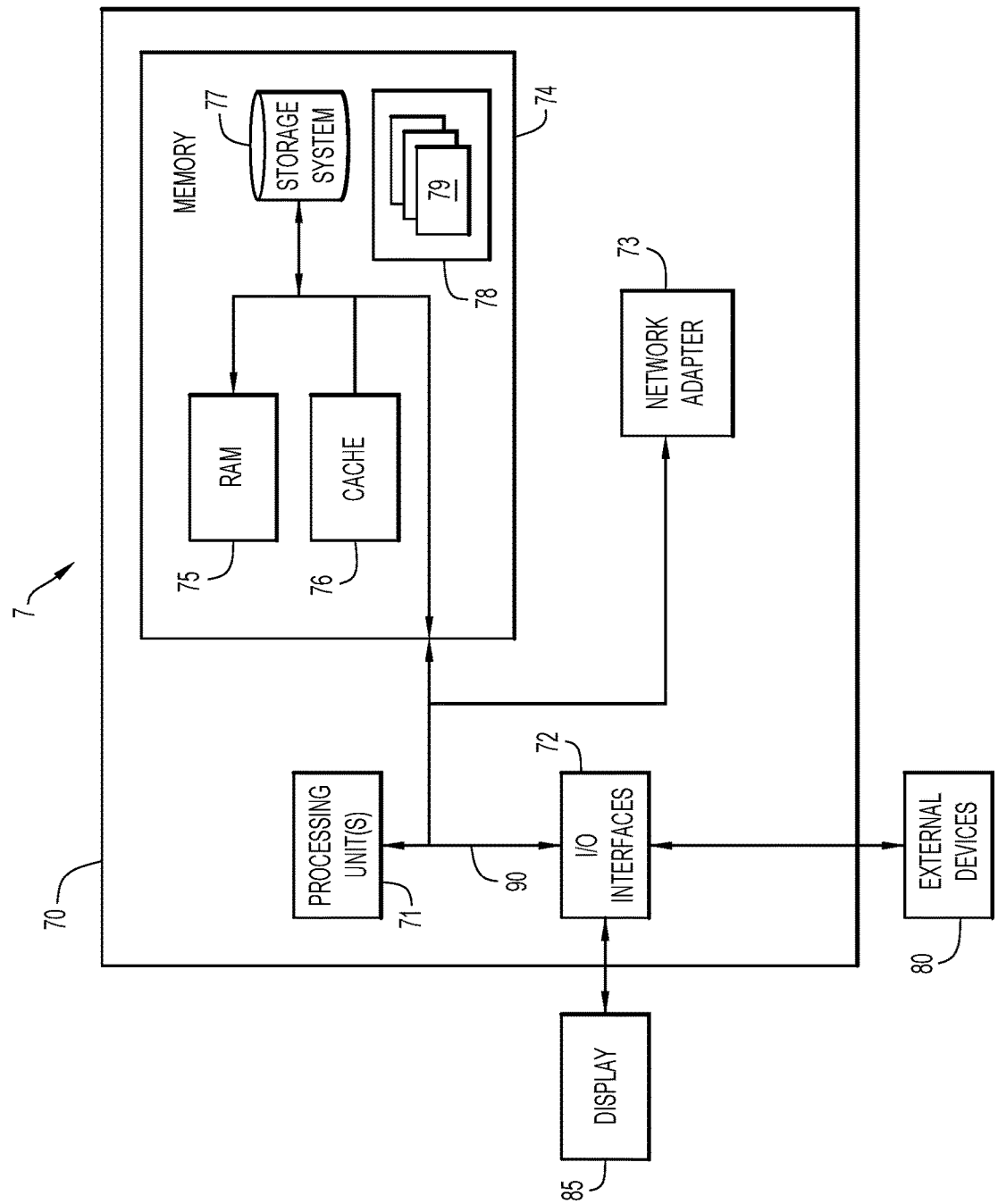
FIG. 7 illustrates a system according to an embodiment of the present invention.

By way of example, as illustrated in FIG. 7, embodiments of the present invention may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the present invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

Figure 8:
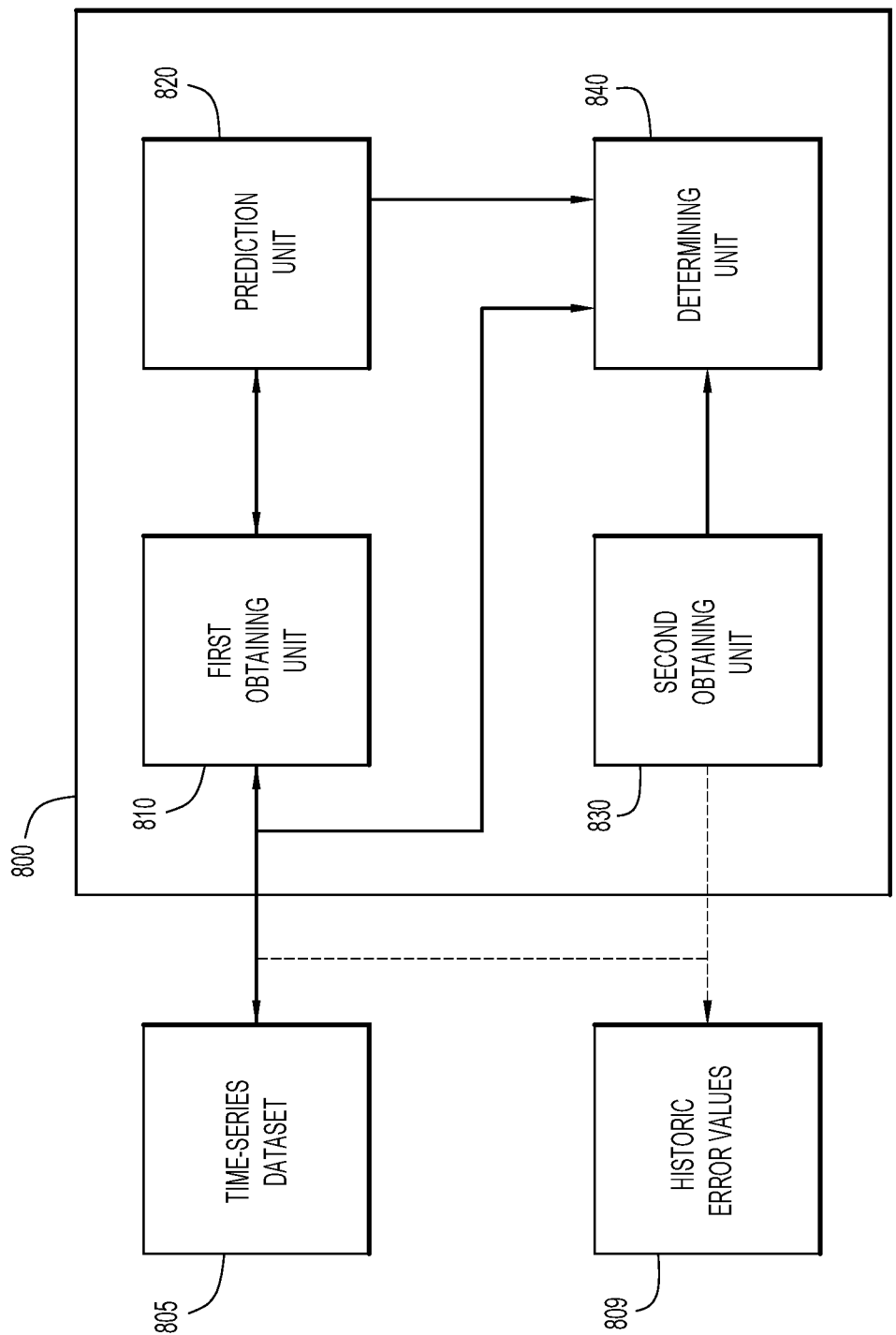
FIG. 8 is a block diagram of an example system in which aspects of the illustrative embodiments may be implemented.

FIG. 8 illustrates a block diagram of a system 800 for determining whether a data element, having a value, of a time-series dataset 805 is an outlier.

The system 800 comprises a first obtaining unit 810 adapted to obtain prediction data from first data of a time-series dataset 805 that temporally precedes the data element. Thus, the first obtaining unit may be adapted to extract, from the time-series dataset, prediction data for predicting a value of the data element.

The system also comprises a prediction unit 820 adapted to predict a value for the data element. In particular, the prediction unit uses the prediction data to predict the value for the data element. Thus, the prediction unit generates a prediction value for the data element.

In some embodiments of the present invention, the prediction unit 820 is adapted to predict, using the prediction data and a plurality of different prediction models, a respective plurality of predicted values for the data element; and identify, from the plurality of predicted values, the predicted value that is closest to the value of the data element. Thus, the prediction unit may use a plurality of different prediction models/methods to predict a respective prediction value, and select the prediction value closest to the (actual) value of the data element as the predicted value for use with future units of the system.

The system 800 also comprises a second obtaining unit 830. The second obtaining unit is adapted to obtain a threshold value for defining, relative to the predicted value of the data element, values for the data element that are considered to be outliers.

In some embodiments of the present invention, the second obtaining unit 830 is adapted to obtain (a plurality of) historic error values for the time-series dataset, each historic error value being representative of a difference between a value and a predicted value of a second data element of the time-series dataset that temporally precedes the data element; and obtain, based on the one or more historic error values, a threshold value obtaining a threshold value for defining, relative to the predicted value of the data element, values for the data element that are considered to be outliers.

The obtained historic error values may be obtained from a stored set 809 of historic error values (e.g., a selection is made from the stored set). In other examples, a historic error value is calculated using (one or more) prediction models to predict a value of a second data element, and calculating an error value using this predicted value and the (actual) value of the second data element. Thus, the historic error values may be calculated from second data elements found in the time-series dataset 805.

The system 800 also comprises a determining unit 840 adapted to determine whether the data element is an outlier based on the threshold value (from the second obtaining unit 830), the identified predicted value (from the prediction unit 820) and the (actual) value of the data element. The (actual) value of the data element may be obtained directly from the time-series dataset 805.

In this way, the system 800 can determine whether a data element of a time-series dataset is an outlier.

Figure 9:
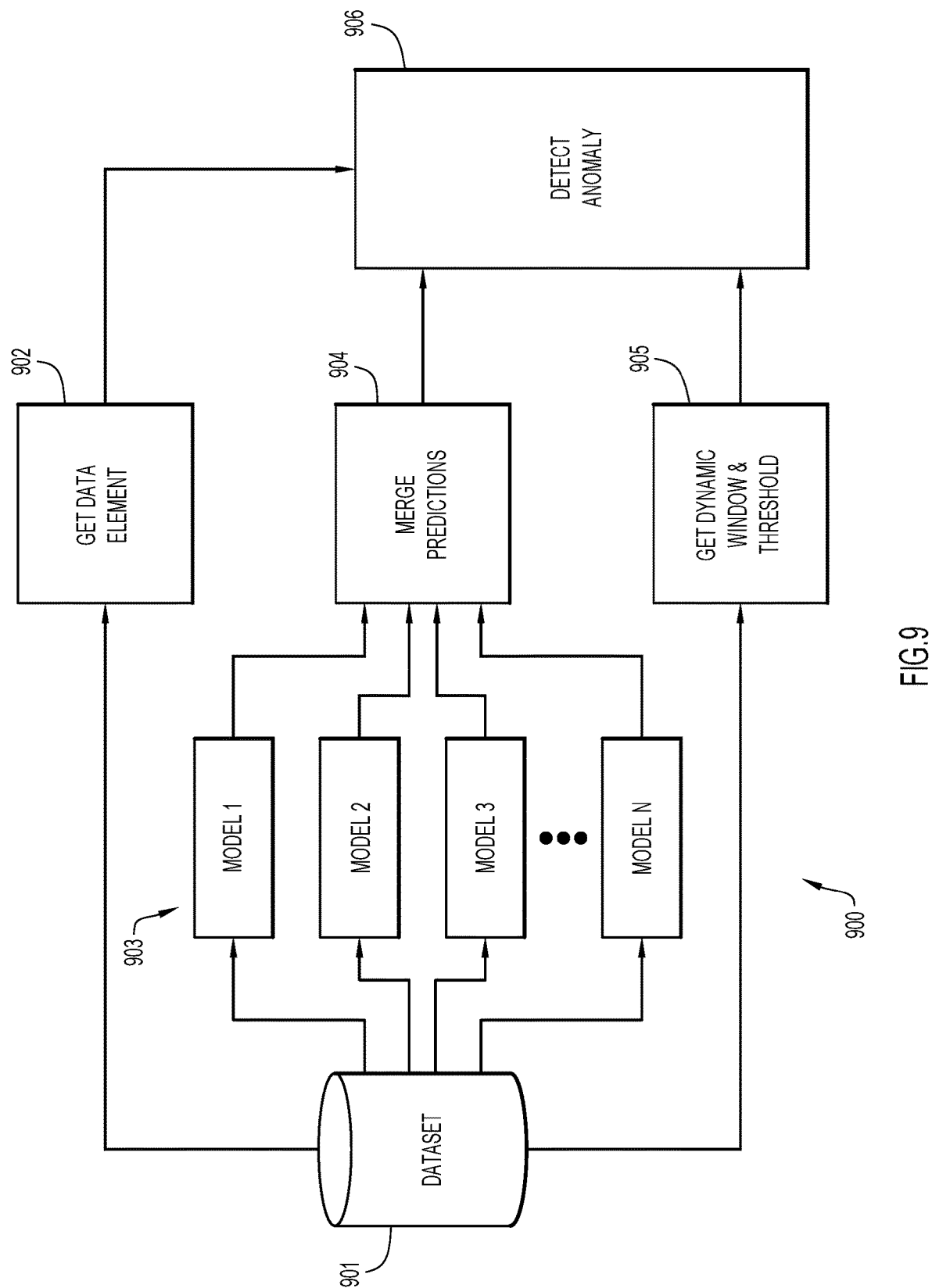
FIG. 9 illustrates an architecture for a method or system according to a preferred embodiment of the present invention.

FIG. 9 illustrates a general architecture 900 or block diagram for a method/system for identifying whether a data element, of a time-series dataset 901, is an outlier, according to a preferred embodiment of the present invention.

The dataset 901 may be an offline dataset (e.g., stored data) or a real-time stream.

The method/system may obtain, in block 902, the data element from the dataset. The method/system may also apply a plurality of prediction models 903 on data elements of the dataset to generate a respective plurality of predicted values for a data element. As previously explained, the prediction models are applied to data elements of the dataset that temporally precede the data element (obtained in block 902) in the dataset 901.

The method/system may comprise merging the prediction models in block 904, to identify the prediction model that best emulates the data element and/or the time-series dataset. This may be performed by identifying the prediction model that generates a predicted value for the data element that is closest to the actual value of the data element.

In block 905, a threshold value for the data element may be generated from the dataset 901. In particular embodiments, historic error values are obtained from the dataset and used to generate the threshold value (as previously described). In further examples, block 905 may comprise using historic error values of data elements associated with a particular window of time to generate the threshold value. The particular window of time may be temporally located or associated with a predetermined time period before the time associated with the data element under investigation.

In block 906, it is determined whether the data element (obtained in step 902) is an anomaly. This may be performed by calculating an error value representative of a difference between an actual value of the data element and the predicted value obtainable from the identified prediction model of block 904. This error value may be compared to the threshold value obtained in block 905 to determine whether the data element is an outlier or not.

Thus, FIG. 9 is a block diagram for an embodiment of the invention, in which it is identified whether a data element (under investigation) is an anomaly/outlier or not. As later described, each block may represent a module or unit of processing system, or a step of a method according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining whether a data element, having a value, of a time-series dataset is an outlier, the method comprising:
   obtaining prediction data, for predicting a value of the data element, from first data of the time-series dataset that temporally precedes the data element;
   predicting, using the prediction data, a predicted value of the data element;
   obtaining an error value for the data element representative of a difference between the value and the predicted value of the data element
   obtaining historic error values for the time-series dataset, each historic error value being representative of a difference between a value and a predicted value of a second data element of the time-series dataset that temporally precedes the data element;
   obtaining, based on one or more of the historic error values, a threshold value for the error value of the data element defining error values for the data element that are considered to be outliers, wherein obtaining the threshold value comprises:
      determining a predetermined number based on a percentage of error values expected to be outliers;
      multiplying a statistical measure of the historic error values by the predetermined number to produce a result, wherein the statistical measure includes one of a mean, median, mode, and standard deviation; and
      determining the threshold value based on the result, wherein a different threshold value is determined for each data element of the time-series dataset; and
   determining whether the data element is an outlier based on a comparison of the threshold value with the error value of the data element.

2. The computer-implemented method of claim 1, wherein the statistical measure is the standard deviation, and the computer-implemented method further comprises:
   adding the result to a mean of the historical error values to determine the threshold value in response to the historical error values comprising positive and negative values.

3. The computer-implemented method of claim 1, wherein each historic error value is a squared error value, being the square of a difference between the value of the second data element of the time-series dataset that temporally precedes the data element and a corresponding predicted value of the second data element of the time-series dataset.

4. The computer-implemented method of claim 1, wherein obtaining a threshold value comprises scaling each historic error value to a value between 0 and 1, based on a maximum value of the historic error values.

5. The computer-implemented method of claim 1, wherein obtaining the threshold value comprises calculating the predetermined number using Chebyshev's inequality.

6. The computer-implemented method of claim 1, wherein predicting a predicted value of the data element comprises:
   predicting, using the prediction data and a plurality of different prediction models, a respective plurality of potential predicted values for the data element; and
   assigning the potential predicted value that is closest to the value of the data element as the predicted value.

7. The computer-implemented method of claim 1, wherein the data element is a data point of the time-series dataset.

8. The computer-implemented method of claim 1, wherein the time-series dataset includes a plurality of recurring time periods each with a plurality of data points, wherein the data element occurs at a point in time within a corresponding recurring time period, and wherein the second data element includes plural data points each occurring at a same point in time within a corresponding previous recurring time period as the point in time of the data element within the corresponding recurring time period, and determining whether the data element is an outlier comprises:
   determining whether the data element is an outlier with respect to the point in time of the data element within the recurring time periods.

9. The computer-implemented method of claim 8, wherein the recurring time periods include an hour, a day or a week.

10. A computer program product for determining whether a data element, having a value, of a time-series dataset is an outlier, the computer program product comprising one or more computer readable storage media collectively having program instructions embodied therewith, the program instructions executable by a processing unit to cause the processing unit to perform a method comprising:
    obtaining prediction data, for predicting a value of the data element, from first data of the time-series dataset that temporally precedes the data element;
    predicting, using the prediction data, a predicted value of the data element;
    obtaining an error value for the data element representative of a difference between the value and the predicted value of the data element
    obtaining historic error values for the time-series dataset, each historic error value being representative of a difference between a value and a predicted value of a second data element of the time-series dataset that temporally precedes the data element;
    obtaining, based on one or more of the historic error values, a threshold value for the error value of the data element defining error values for the data element that are considered to be outliers, wherein obtaining the threshold value comprises:
       determining a predetermined number based on a percentage of error values expected to be outliers;
       multiplying a statistical measure of the historic error values by the predetermined number to produce a result, wherein the statistical measure includes one of a mean, median, mode, and standard deviation; and
       determining the threshold value based on the result, wherein a different threshold value is determined for each data element of the time-series dataset; and
    determining whether the data element is an outlier based on a comparison of the threshold value with the error value of the data element.

11. The computer program product of claim 10, wherein each historic error value is a squared error value, being the square of a difference between the value of the second data element of the time-series dataset that temporally precedes the data element and a corresponding predicted value of the second data element of the time-series dataset.

12. The computer program product of claim 10, wherein predicting a predicted value of the data element comprises:
predicting, using the prediction data and a plurality of different prediction models, a respective plurality of potential predicted values for the data element; and
assigning the potential predicted value that is closest to the value of the data element as the predicted value.

13. The computer program product of claim 10, wherein the time-series dataset includes a plurality of recurring time periods each with a plurality of data points, wherein the data element occurs at a point in time within a corresponding recurring time period, and wherein the second data element includes plural data points each occurring at a same point in time within a corresponding previous recurring time period as the point in time of the data element within the corresponding recurring time period, and determining whether the data element is an outlier comprises:
determining whether the data element is an outlier with respect to the point in time of the data element within the recurring time periods.

14. The computer program product of claim 13, wherein the recurring time periods include an hour, a day or a week.

15. A computer system for determining whether a data element, having a value, of a time-series dataset is an outlier, comprising:
at least one processor configured to:
obtain prediction data, for predicting a value of the data element, from first data of the time-series dataset that temporally precedes the data element;
predict, using the prediction data, a predicted value of the data element;
obtain an error value for the data element representative of a difference between the value and the predicted value of the data element
obtain historic error values for the time-series dataset, each historic error value being representative of a difference between a value and a predicted value of a second data element of the time-series dataset that temporally precedes the data element;
obtain, based on one or more of the historic error values, a threshold value for the error value of the data element defining error values for the data element that are considered to be outliers, wherein obtaining the threshold value comprises:
determining a predetermined number based on a percentage of error values expected to be outliers;
multiplying a statistical measure of the historic error values by the predetermined number to produce a result, wherein the statistical measure includes one of a mean, median, mode, and standard deviation; and
determining the threshold value based on the result, wherein a different threshold value is determined for each data element of the time-series dataset; and
determine whether the data element is an outlier based on a comparison of the threshold value with the error value of the data element.

16. The computer system of claim 15, wherein each historic error value is a squared error value, being the square of a difference between the value of the second data element of the time-series dataset that temporally precedes the data element and a corresponding predicted value of the second data element of the time-series dataset.

17. The computer system of claim 15, wherein predicting a predicted value of the data element comprises:
predicting, using the prediction data and a plurality of different prediction models, a respective plurality of potential predicted values for the data element; and
assigning the potential predicted value that is closest to the value of the data element as the predicted value.

18. The computer system of claim 15, wherein the time-series dataset includes a plurality of recurring time periods each with a plurality of data points, wherein the data element occurs at a point in time within a corresponding recurring time period, and wherein the second data element includes plural data points each occurring at a same point in time within a corresponding previous recurring time period as the point in time of the data element within the corresponding recurring time period, and determining whether the data element is an outlier comprises:
determining whether the data element is an outlier with respect to the point in time of the data element within the recurring time periods.

19. A system for determining whether a data element, having a value, of a time-series dataset is an outlier, the system comprising:
at least one processor including:
a first obtaining module to obtain prediction data, for predicting a value of the data element, from first data of the time-series dataset that temporally precedes the data element;
a prediction module to predict using the prediction data, a predicted value of the data element;
a second obtaining module to:
obtain an error value for the data element representative of a difference between the value and the predicted value of the data element
obtain historic error values for the time-series dataset, each historic error value being representative of a difference between a value and a predicted value of a second data element of the time-series dataset that temporally precedes the data element,; and
obtain, based on one or more of the historic error values, a threshold value for the error value of the data element defining error values for the data element that are considered to be outliers, wherein obtaining the threshold value comprises:
determining a predetermined number based on a percentage of error values expected to be outliers;
multiplying a statistical measure of the historic error values by the predetermined number to produce a result, wherein the statistical measure includes one of a mean, median, mode, and standard deviation; and
determining the threshold value based on the result, wherein a different threshold value is determined for each data element of the time-series dataset; and
a determining module to determine whether the data element is an outlier based on a comparison of the threshold value with the error value of the data element.

20. The system of claim 19, wherein each historic error value is a squared error value, being the square of a difference between the value of the second data element of the time-series dataset that temporally precedes the data element and a corresponding predicted value of the second data element of the time-series dataset.

21. The system of claim 19, wherein predicting a predicted value of the data element comprises:

predicting, using the prediction data and a plurality of different prediction models, a respective plurality of potential predicted values for the data element; and assigning the potential predicted value that is closest to the value of the data element as the predicted value.

22. The system of claim 19, wherein the time-series dataset includes a plurality of recurring time periods each with a plurality of data points, wherein the data element occurs at a point in time within a corresponding recurring time period, and wherein the second data element includes plural data points each occurring at a same point in time within a corresponding previous recurring time period as the point in time of the data element within the corresponding recurring time period, and determining whether the data element is an outlier comprises:

determining whether the data element is an outlier with respect to the point in time of the data element within the recurring time periods.

* * * * *